(12) United States Patent
Morioka et al.

(10) Patent No.: US 8,964,065 B2
(45) Date of Patent: Feb. 24, 2015

(54) VIDEO PICTURE EXTRACTING APPARATUS, IMAGING APPARATUS AND RECORDING MEDIUM

(75) Inventors: Yoshihiro Morioka, Nara (JP); Katsuhiko Yoshida, Osaka (JP); Hiroji Takebayashi, Hyogo (JP); Eiji Yamauchi, Osaka (JP); Keiko Ando, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 304 days.

(21) Appl. No.: 13/578,441

(22) PCT Filed: Feb. 10, 2011

(86) PCT No.: PCT/JP2011/000771
§ 371 (c)(1),
(2), (4) Date: Aug. 10, 2012

(87) PCT Pub. No.: WO2011/099299
PCT Pub. Date: Aug. 18, 2011

(65) Prior Publication Data
US 2012/0307109 A1 Dec. 6, 2012

(30) Foreign Application Priority Data
Feb. 10, 2010 (JP) ................................. 2010-027228

(51) Int. Cl.
*H04N 5/262* (2006.01)
*H04N 5/77* (2006.01)
(Continued)

(52) U.S. Cl.
CPC .............. *H04N 5/772* (2013.01); *G11B 27/034* (2013.01); *G11B 27/105* (2013.01); *G11B 27/28* (2013.01); *H04N 5/23219* (2013.01); *H04N 5/235* (2013.01); *H04N 5/783* (2013.01); *H04N 5/93* (2013.01); *H04N 21/4325* (2013.01); *H04N 21/4394* (2013.01); *H04N 21/44008* (2013.01);
(Continued)

(58) Field of Classification Search
CPC ....................................................... H04N 5/335
USPC .................................. 382/100, 461; 386/200
See application file for complete search history.

(56) References Cited

U.S. PATENT DOCUMENTS 8,421,885 B2 * 4/2013 Kameyama ................ 348/231.6
2007/0047913 A1 3/2007 Kagawa
(Continued)

FOREIGN PATENT DOCUMENTS

JP 2005-101906 A 4/2005
JP 2007-060060 A 3/2007
(Continued)

OTHER PUBLICATIONS

International Search Report issued in International Patent Application No. PCT/JP2011/000771 dated Mar. 22, 2011.

*Primary Examiner* — Tuan Ho
(74) *Attorney, Agent, or Firm* — McDermott Will & Emery LLP

(57) ABSTRACT

Digest playback which suits various preferences is realized. A video camera (100) extracts a portion to be played back as a digest from a video picture. The video camera (100) includes a control section (300) configured to extract attribute information concerning a video picture from the video picture. The attribute information is configured so that a user can input contents of the attribute information.

17 Claims, 18 Drawing Sheets

(51) Int. Cl.
*G11B 27/034* (2006.01)
*G11B 27/10* (2006.01)
*G11B 27/28* (2006.01)
*H04N 5/232* (2006.01)
*H04N 5/235* (2006.01)
*H04N 5/783* (2006.01)
*H04N 5/93* (2006.01)
*H04N 21/432* (2011.01)
*H04N 21/439* (2011.01)
*H04N 21/44* (2011.01)
*H04N 21/8549* (2011.01)
*H04N 9/804* (2006.01)

(52) U.S. Cl.
CPC .......... *H04N 21/8549* (2013.01); *H04N 9/8042* (2013.01)
USPC ...................................... 348/239; 348/333.02

(56) References Cited

U.S. PATENT DOCUMENTS

| | | |
|---|---|---|
| 2007/0053660 A1 | 3/2007 | Abe et al. |
| 2008/0240503 A1 | 10/2008 | Okada et al. |
| 2008/0310725 A1 | 12/2008 | Kurata et al. |
| 2009/0273687 A1* | 11/2009 | Tsukizawa et al. ........ 348/222.1 |
| 2009/0285546 A1 | 11/2009 | Yoshida |
| 2010/0091113 A1 | 4/2010 | Morioka et al. |

FOREIGN PATENT DOCUMENTS

| | | |
|---|---|---|
| JP | 2007-72520 A | 3/2007 |
| JP | 2008-103802 A | 5/2008 |
| JP | 2008-227860 A | 9/2008 |
| JP | 2008-278467 A | 11/2008 |
| JP | 2008-312061 A | 12/2008 |
| JP | 2009-077026 A | 4/2009 |
| JP | 2009-077026 A | 4/2009 |
| JP | 2009-278592 A | 11/2009 |

* cited by examiner

FIG.4

| SCENE NUMBER | START TIME | END TIME | REPRESENTATIVE TIME |
|---|---|---|---|
| 1 | 0:00:00 | 0:00:15 | 0:00:10 |
| 2 | 0:00:15 | 0:00:30 | 0:00:15 |
| 3 | 0:00:30 | 0:01:01 | 0:00:45 |
| 4 | 0:01:01 | 0:03:00 | 0:0:2:30 |
| 5 | 0:03:00 | 0:05:30 | 0:05:00 |
| 6 | 0:05:30 | 0:06:00 | 0:05:40 |
| ... | | | |

FIG.5

| IDENTIFICATION | CONTENTS OF ATTRIBUTE INFORMATION | EVALUATION VALUE |
|---|---|---|
| A | CLIP-IN | 100 |
| B | EXTRACTION OF PARTICULAR SOUND | 50 |
| C | (AFTER CAMERA WORK) STILL SHOOTING | 40 |
| D | ZOOM-UP | 30 |
| E | PANNING, TILTING | 25 |
| F | CLIP-OUT | 90 |
| G | ZOOM-DOWN | 30 |
| H | EXTRACTION OF PARTICULAR COLOR | 50 |
| I | IMAGE BLUR | −20 |
| J | SHOOTING GROUND (IN VERTICAL DIRECTION) | −10 |
| K | | |
| ... | ... | ... |
| X | FACE DETECTION (PERSON A) | 100 |
| Y | FACE DETECTION (PERSON B) | 80 |
| Z | FACE DETECTION | 50 |

FIG.8

| SCENE NUMBER | START TIME | END TIME | REPRESENTATIVE TIME |
|---|---|---|---|
| 1 | 0:00:00 | 0:01:00 | 0:00:30 |
| 2 | 0:02:00 | 0:03:00 | 0:02:30 |
| 5 | 0:20:00 | 0:21:00 | 0:20:40 |

FIG.11

| IDENTIFICATION | CONTENTS OF ATTRIBUTE INFORMATION | EVALUATION VALUE |
|---|---|---|
| A | CLIP-IN | 100 |
| B | EXTRACTION OF PARTICULAR SOUND | 50 |
| C | (AFTER CAMERA WORK) STILL SHOOTING | 40 |
| D | ZOOM-UP | 30 |
| E | PANNING, TILTING | 25 |
| F | CLIP-OUT | 90 |
| G | ZOOM-DOWN | 30 |
| H | EXTRACTION OF PARTICULAR COLOR | 50 |
| I | IMAGE BLUR | −20 |
| J | SHOOTING GROUND (IN VERTICAL DIRECTION) | −10 |
| K | | |
| . | . | . |
| . | . | . |
| . | . | . |
| X | FACE DETECTION (PERSON A) | 60 |
| Y | FACE DETECTION (PERSON B) | 90 |
| Z | FACE DETECTION | 50 |

FIG.13

| SCENE NUMBER | START TIME | END TIME | REPRESENTATIVE TIME |
|---|---|---|---|
| 1 | 0:00:00 | 0:01:00 | 0:00:30 |
| 4 | 0:12:30 | 0:14:00 | 0:12:35 |
| 5 | 0:20:00 | 0:21:00 | 0:20:40 |

VIDEO PICTURE EXTRACTING APPARATUS, IMAGING APPARATUS AND RECORDING MEDIUM

TECHNICAL FIELD

A technique disclosed herein relates to a video picture extracting apparatus for extracting a portion which is to be played back as a digest from the video picture and an imaging apparatus including the video picture extracting apparatus, and furthermore, relates to a program for extracting a portion which is to be played back as a digest from the video picture, and a recording medium for recording the program.

BACKGROUND ART

Conventionally, techniques for extracting a portion from a video picture to playback a digest (summary) video picture have been known. It requires more than a little time to play back the whole content of a video picture. Therefore, there has been a need for comprehending the content of a video picture in a short time. There is also a need for extracting an important potion from a video picture to view only the important portion. Specifically, a video picture shot by a general user, who is not a professional user, using an imaging apparatus such as a video camera and a digital still camera, etc. does not include a scenario for the video picture, and merely includes occurred events arranged in a sequential order in the video picture. Thus, specifically in such a case, the above-described needs are great.

To meet the above-described needs, an imaging apparatus according to PATENT DOCUMENT 1 is configured to evaluate a scene based on metadata of a video picture, and play back a digest with a reduced number of scenes and clips for a video picture, based on a result of the evaluation.

CITATION LIST

Patent Document

PATENT DOCUMENT 1: Japanese Patent Application No. 2008-227860

SUMMARY OF THE INVENTION

Technical Problem

Depending on viewer's preference, a preferable content of a digest greatly varies. However, metadata and an evaluation based on the metadata according to PATENT DOCUMENT 1 are fixed, and do not correspond to user's preference.

In view of the foregoing, a technique disclosed herein has been devised, and it is therefore an object of the present disclosure to realize digest playback corresponding to various preferences.

Solution to the Problem

A video picture extracting apparatus according to the present disclosure includes a memory section configured to store attribute information concerning a video picture which is to be extracted from the video picture, and a control section configured to extract the attribute information stored in the memory section from a video picture to extract a portion of the video picture to be played back as a digest, and at least a portion of the attribute information stored in the memory section is capable of being input by a user.

Another video picture extracting apparatus includes a memory section configured to store correspondence data between attribute information concerning a video picture which is to be extracted from the video picture and an evaluation for the attribute information, and a control section configured to extract the attribute information stored in the memory section from a video picture to extract a portion of the video picture to be played back as a digest, and evaluate a portion of the video picture having the attribute information based on the correspondence data, and at least a portion of each of the attribute information and the evaluation stored in the memory section is capable of being input by a user.

Still another video picture extracting apparatus includes a memory section configured to store attribute information concerning a video picture which is to be extracted from the video picture, an input section configured to input the attribute information to the memory section according to an input operation of a user, and a control section configured to extract a portion of the video picture to be played back as a digest from the video picture based on the attribute information stored in the memory section.

Furthermore, another video picture extracting apparatus includes a memory section configured to store correspondence data between attribute information concerning a video picture which is to be extracted from the video picture and an evaluation for the attribute information, an input section configured to input at least one of the attribute information or the evaluation to the memory section according to an input operation of a user, and a control section configured to extract a portion of the video picture to be played back as a digest from the video picture based on the attribute information and the evaluation stored in the memory section.

An imaging apparatus according to the present disclosure includes an imaging system configured to obtain a video picture, and the video picture extracting apparatus of any one of the above-described video picture extracting apparatuses.

A program according to the present disclosure is configured to make a computer execute receiving, for correspondence data between attribute information concerning a video picture which is to be extracted from the video picture the evaluation for the attribute information, an input of at least one of the attribute information or the evaluation by a user, extracting the attribute information included in the correspondence data from the video picture, and extracting a portion of the video picture which is to be played back as a digest from the video picture, based on the correspondence data and the extracted attribute information.

A recording medium according to the present disclosure is a recording medium readable by a computer, storing the computer program.

Advantages of the Invention

The video picture extracting apparatus allows a user to arbitrarily input the attribute information, and thus, the attribute information reflecting user's preference can be extracted. Therefore, with reference to the attribute information, digest playback according to user's preference can be realized.

The another video picture extracting apparatus allows a user to arbitrarily input at least one of the attribute information and the evaluation, and thus, an evaluation of a video picture reflecting user's preference can be performed. Therefore, with reference to the evaluation, digest playback according to user's preference can be realized.

The imaging apparatus can realize digest playback corresponding to user's preference.

The program can realize digest playback corresponding to user's preference.

The recording medium can realize digest playback corresponding to user's preference.

BRIEF DESCRIPTION OF THE DRAWINGS

FIG. 4 is a chart showing an example case where a clip is divided into a plurality of scenes.

FIG. 5 is a table of correspondence data between various attribute information items and evaluations for the associated attribute information items.

FIG. 7A shows a video picture including a face of a person A. FIG. 7B shows a video picture including a face of a person B. FIG. 7C shows a video picture including faces of the persons A and B. FIG. 7D shows a video picture including a face of the person A with many other people.

FIG. 8 is a chart showing playback information.

FIG. 11 is a table of correspondence data between various attribute information items and evaluations for the associated attribute information items.

FIG. 13 is a chart showing playback information.

DESCRIPTION OF EMBODIMENTS

Example embodiments will be described in detail below with reference to the accompanying drawings.

First Embodiment

1. Configuration of Video Camera

Figure 1:
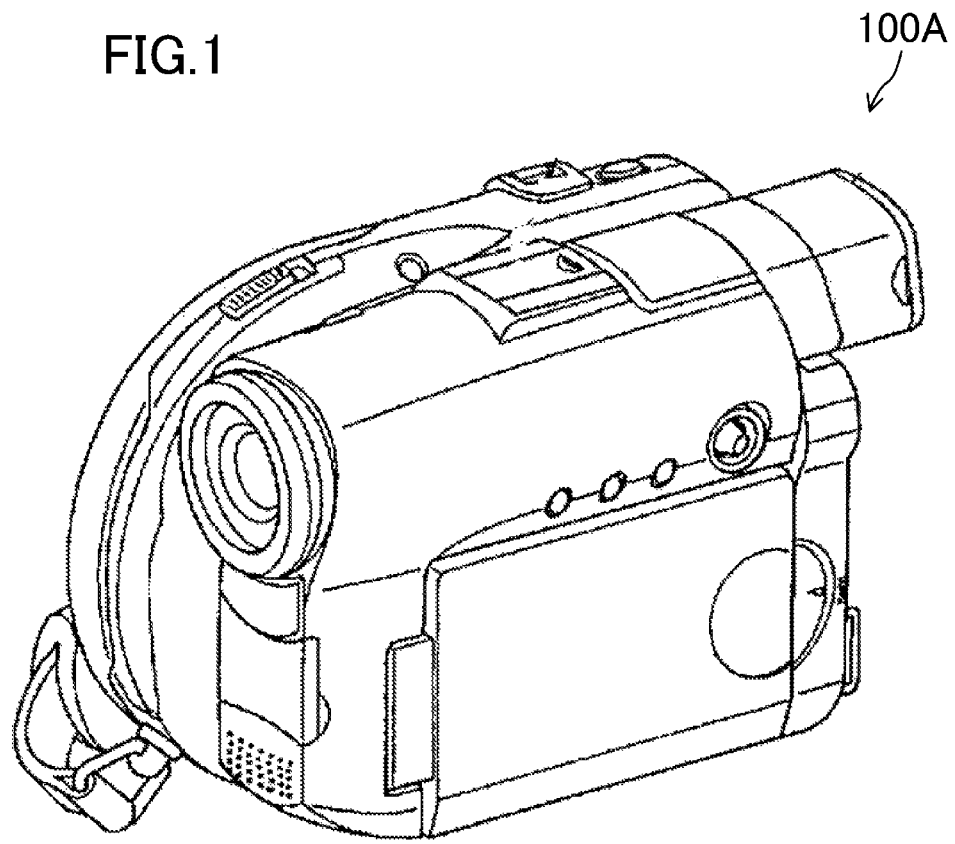
FIG. 1 is a perspective view of a video camera according to this embodiment.
Figure 2:
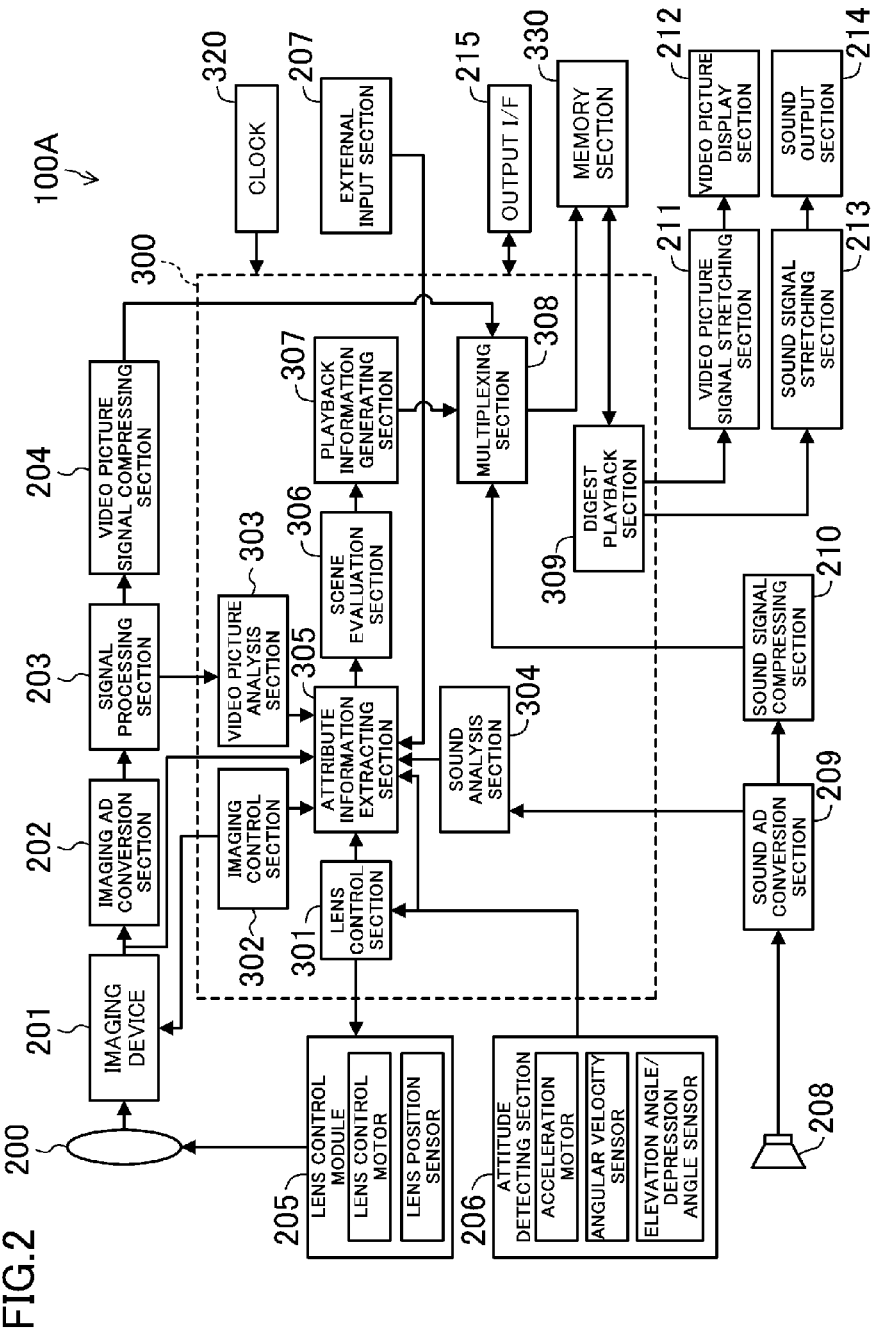
FIG. 2 is a block diagram schematically illustrating a configuration of the video camera.

FIG. 1 is a perspective view of a video camera 100A as an example imaging apparatus, and FIG. 2 is a block diagram schematically illustrating a configuration of the video camera 100A.

The video camera 100A is used to shoot a video picture, record the video picture, and play back the video picture. Also, the video camera 100A extracts a portion to be played back as a digest from the video picture, and furthermore performs digest playback. The video camera 100A includes a lens group 200, an imaging device 201, a video picture AD converting section (analog-to-digital converter) 202, a signal processing section 203, a video picture signal compressing section 204, a lens control module 205, an attitude detecting section 206, an external input section 207, a microphone 208, a sound signal ADC (analog-to-digital converter) 209, a sound signal compressing section 210, a video picture signal stretching section 211, a video picture display section 212, a sound signal stretching section 213, a sound output section 214, an output I/F (interface) 215, a control section 300, a clock 320, and a memory section 330. The video camera 100A serves as a video picture extracting apparatus and an imaging apparatus.

The lens group 200 includes a plurality of lenses, and forms incident light from a subject into an image on the imaging device 201. The lens group 200 is configured to be capable of adjusting a distance between the plurality of lenses, and changes a focus distance and a zoom scale (a magnification of a video picture) by changing the distance between the lenses. Adjustment of the focus distance and the zoom scale may be performed manually by a user, or automatically by the control section 300, etc., which will be described later.

The imaging device 201 converts incident light into an electrical signal. The imaging device 201 is formed of a CCD or a CMOS. The imaging device 201 outputs an electrical signal within an arbitrary range on an imaging plane. Also, the imaging device 201 can output, in addition to information concerning a video picture, information such as chromaticity space information at three primary color points, white color coordinates, gain information for at least two of the three primary colors, color temperature information, Δuv (delta uv), and gamma information concerning the three primary colors or a luminance signal, etc. Therefore, an output from the imaging device 201 is input to not only the video picture AD converting section 202, but also an attribute information extracting section 305 of the control section 300, which will be described later.

The video picture AD converting section 202 converts an analog electrical signal output by the imaging device 201 into a digital signal.

The signal processing section 203 converts the digital signal output by the video picture AD converting section 202 into a predetermined video picture signal format such as NTSC (national television system committee) and PAL (phase alternating line), etc. For example, the signal processing section 203 converts the digital signal from the video picture AD converting section 202 into a digital signal (video picture data) complying with the number of horizontal lines, the number of scanning lines, and a frame rate of NTSC. An output from the signal processing section 203 is input to the control section 300. The signal processing section 203 is formed of, for example, an IC for video picture signal conversion. Note that as the video picture signal format, there are a so-called full high vision format in which one video picture frame includes 1920 effective pixels in a horizontal direction and 1080 effective pixels in a vertical direction, and a format in which one video picture frame includes 1280 effective pixels in the horizontal direction and 720 effective pixels in the vertical direction.

The video picture signal compressing section 204 performs predetermined coding to a digital video picture signal output from the signal processing section 203 to compress a data amount. As specific examples of code conversion, there are coding schemes such as MPEG (moving picture experts group) 2, MPEG4, and H264, etc. An output from the video picture signal compressing section 204 is input to the control section 300. The video picture signal compressing section 204 is formed of, for example, an IC for signal compression/stretching.

The lens control module 205 detects a state of the lens group 200, and operates the lens group 200. The lens control module 205 includes a lens control motor and a lens position sensor. The lens position sensor detects the distance between the plurality of lenses of the lens group 200 or a positional relationship therebetween. The lens position sensor outputs the detection signal to the control section 300. The lens control module 205 includes lens control motors of two types. One of the lens control motors moves the lens group 200 along an optical axis direction based on a control signal from the control section 300. Thus, the distance between the plurality of lenses of the lens group 200 is changed, and the focus distance and the zoom scale of the lens group 200 are adjusted. The other lens control motor moves at least one of the plurality of lenses of the lens group 200 (a lens for correction of image blur) in a plane perpendicular to the optical axis based on a control signal from the control section 300. Thus, image blur is corrected.

The attitude detecting section 206 detects an attitude of a main body of the video camera 100A. The attitude detecting section 206 includes an acceleration sensor, an angular velocity sensor, and an elevation angle/depression angle sensor. With these sensors, the attitude of the video camera 100A at the time of shooting can be recognized. Note that in order to closely detect the attitude of the video camera 100A, the acceleration sensor and the angular velocity sensor are preferably configured to detect the attitude along three axis directions (i.e., a vertical direction, a front-back direction, and a left-right direction of the video camera 100A) which are perpendicular to one another. A signal from the attitude detecting section 206 is input to the control section 300. Note that the attitude detecting section 206 does not have to have the above-described configuration, but may be configured to include one of the above-described sensors, or some other sensor than the above-described sensors.

The external input section 207 is a member which inputs information from the outside of the video camera 100A to the video camera 100A. A signal from the external input section 207 is input to the control section 300. Note that in FIG. 2, the signal from the external input section 207 is input only to the attribute information extracting section 305 of the control section 300, but the signal is also input to a section such as a lens control section 310, etc. which corresponds to an input operation. At the time of shooting, various information from the outside of the video camera 100A are input to the video camera 100A via the external input section 207. For example, the external input section 207 includes an input button which is one of input interfaces for receiving an input of information by the user, a reception section which receives shooting index information, etc. input externally via a communication system, and a tripod sensor which detects whether the video camera 100A is placed on a tripod. For example, various requests of the user, such as requests for start/stop of shooting, insertion of a marking in a video picture being shot, and input and setting of attribute information and an evaluation for the attribution information, which will be described later, can be sent to the video camera 100A by an operation of the input button by the user. Specifically, the external input section 207 serves as an input section which inputs at least one of the attribute information and the evaluation for the attribution information, which will be described later, to the memory section 330 according to the input operation by the user. The shooting index information includes, for example, an identification number such as a number for identification of a shooting scene during movie shooting, and a number indicating how many times shooting has been performed, which is used to identify each shooting. The tripod sensor is formed of a switch provided in a portion of the video camera 100A to which a tripod is fixed. Whether shooting is performed using a tripod or not can be determined by the tripod sensor.

The microphone 208 converts a sound around the video camera 100A into an electrical signal to output the electrical signal as a sound signal.

The sound signal AD converting section 209 converts the analog sound signal output by the microphone 208 into a digital signal (sound data).

The sound signal compressing section 210 converts the digital sound signal output by the sound signal AD converting section 209 using a predetermined algorithm. As a coding scheme, MP3 (MPEG Audio Layer-3), and AAC (Advanced Audio Coding), etc. can be used. The sound signal compressing section 210 is formed of, for example, an IC for compression.

The video picture signal stretching section 211 decodes a video picture signal output from the control section 300. An output from the video picture signal stretching section 211 is input to the video picture display section 212. The video picture signal stretching section 211 is formed of, for example, an IC for video picture signal stretching.

The video picture display section 212 displays a video picture recorded in the video camera 100A, or a video picture being shot by the video camera 100A in real time. The video camera 100A also displays various information such as information concerning shooting and equipment information, etc. The video picture display section 212 is formed of, for example, a touch-screen liquid crystal display. Thus, the touch-screen video picture display section 212 also function as the external input section 207.

The sound signal stretching section 213 decodes a sound signal output from the control section 300. An output from the sound signal stretching section 213 is input to the sound output section 214. The sound signal stretching section 213 is formed of, for example, an IC for sound signal stretching.

The sound output section 214 outputs a sound associated with a video picture. The sound output section 214 also outputs a warning tone from the video camera 100A to notify the user. The sound output section 214 is formed of, for example, a speaker.

The output I/F 215 is an interface for outputting a video picture signal from the video camera 100A to the outside. Specifically, the output I/F 215 is a cable interface used when the video camera 100A and an external equipment are connected together, and a memory card interface used when the video picture signal is recorded in a memory card, etc.

The control section 300 controls the entire video camera 100A. The control section 300 is configured to receive/transmit signals with the imaging device 201, the signal processing section 203, the video picture signal compressing section 204, the lens control module 205, the attitude detecting section 206, the external input section 207, the sound signal AD converting section 209, the sound signal compressing section 210, the video picture signal stretching section 211, the sound signal stretching section 213, the output I/F 215, and the memory section 330, etc. In this embodiment, the control section 300 is formed of a CPU. The control section 300 executes various controls for video camera 100A by reading and executing a program stored in the memory section 330.

Examples of controls executed by the control section 300 include control of the focus distance and zoom of the lens group 200, processing of input signals from the attitude detecting section 206 and the external input section 207, and operation control of an IC such as the signal processing section 203, the video picture signal compressing section 204, the sound signal compressing section 210, the video picture signal stretching section 211, and the sound signal stretching section 213, etc. Although not shown in the drawings, a signal is appropriately AD converted or DA converted between the control section 300 and the lens control module 205, etc. Note that the control section 300 can be formed of an integrated circuit such as an IC, etc.

The clock 320 outputs a clock signal which is to be a reference for a processing operation to the control section 300, etc. which operates in the video camera 100A. Note that the clock 320 can use a single clock or a plurality of clocks depending on an integrated circuit to be used and data to be processed. Also, a clock signal of a single oscillator may be multiplied to be an arbitrary multiple and used.

The memory section 330 includes a ROM (read only memory), a RAM (random access memory), and a HDD (hard disc drive). The ROM is used to store a program which is to be processed by the control section 300 and various data for operating the program. The RAM is used as a memory area, etc. used when the program which is to be processed by the control section 300 is executed. The RAM can be also used as a memory area of the IC. The HDD stores various data such as video picture data and still image data, etc. code-converted by the video picture signal compressing section 204. The HDD also stores a program which is executed by the control section 300. Note that the program may be stored not only in the HDD but also in a semiconductor memory, or a transportable memory medium such as a CD-ROM and a DVD, etc.

The control section 300 will be described in detail below. Herein, only a necessary configuration of the control section 300 for performing digest playback will be described. Note that the control section 300 also has a configuration for fulfilling a similar function to that of a commonly used video camera, for example, a configuration for recording and playing back a video picture which has been shot.

The control section 300 includes a lens control section 301 which controls the lens control module 205, an imaging control section 302 which controls the imaging device 201, a video picture analysis section 303 which analyzes an output from the signal processing section 203, a sound analysis section 304 which analyzes an output from the sound signal AD converting section 209, an attribute information extracting section 305 which extracts attribute information in a video picture, a scene evaluation section 306 which evaluates a scene, a playback information generating section 307 which generates playback information for digest playback, a multiplexing section 308 which multiplexes video picture data and sound data, and a digest playback section 309 which performs digest playback. The control section 300 reads and executes a program stored in the memory section 330, thereby realizing the following various types of processing.

A detection signal of the lens position sensor of the lens control module 205 and detection signals of the sensors of the attitude detecting section 206 are input to the lens control section 301. The lens control section 301 outputs a control signal to properly arrange the lens group 200 to the lens control motor based on the above-described detection signals and information from other members such as imaging device 201, etc. Thus, the lens control section 301 performs zoom control, focus control, and image blur correction control, etc.

The lens control section 301 also outputs the control signal of the lens group 200 to the attribute information extracting section 305. Note that the detection signals of the sensors of the attitude detecting section 206 are also output to the attribute information extracting section 305.

The imaging control section 302 controls an operation of the imaging device 201. The imaging control section 302 performs control of exposure, shooting speed, and sensitivity, etc. at the time of shooting to the imaging device 201. A control signal output from the imaging control section 302 is output not only to the imaging device 201 but also to the attribute information extracting section 305.

The video picture analysis section 303 extracts a feature of a video picture based on video picture data from the signal processing section 203. The video picture analysis section 303 detects color information (for example, distributions of colors included in a video picture) and white balance information of a video picture. Note that detection of color distributions can be realized by confirming color information included in data forming a digital video picture signal. When a video picture includes a face of a person, the video picture analysis section 303 detects the face from the video picture. Face detection can be realized by using a pattern matching, etc.

The sound analysis section 304 analyzes sound data from the sound signal AD converting section 209, and extracts a feature sound. The feature sound herein means, for example, a voice of a person who is shooting a video picture, a pronunciation of a particular word, cheers, and a sound of a gunshot, etc. Such a sound can be detected, for example, by a method in which a particular frequency of such a sound (voice) is registered in advance and the sound is distinguished by comparison to the registered frequency. For example, another method in which, when an input level of a sound is equal to or higher than a predetermined level, it is determined that the sound is a feature sound may be used.

The attribute information extracting section 305 extracts attribute information concerning a video picture. The attribute information is information indicating attributes of a video picture, i.e., information concerning shooting (which will be hereinafter also referred to as "shooting information"), external input information, and other information. Output signals from the imaging device 201, the attitude detecting section 206, the external input section 207, the lens control section 301, the imaging control section 302, the video picture analysis section 303, and the sound analysis section 304 are input to the attribute information extracting section 305. The attribute information extracting section 305 extracts the attribute information based on the output signals.

The attribute information concerning a video picture includes attribute information concerning shooting, such as a state of the imaging apparatus at the time of shooting a video picture and camera work, etc., attribute information concerning a video picture when the video picture is created using CG, etc., attribute information concerning a subject and a background which a video picture itself includes, attribute information concerning a sound associated with a video picture, and attribute information concerning a video picture edit content when the video picture is edited using an editing equipment, etc.

For example, as examples for attribute information concerning an imaging apparatus at the time of shooting a video picture, there are focus distance, zoom scale, exposure, shooting speed, sensitivity, chromaticity space information at three primary color points, white balance, gain information for at least two of the three primary colors, color temperature information, $\Delta uv$ (delta uv), gamma information on the three primary colors or a luminance signal, color distribution, face identification information, camera attitude (acceleration speed, angular velocity, and elevation angle/depression angle, etc.), shooting time (shooting start time and shooting end time), shooting index information, user input, frame rate, and sampling frequency, etc. For example, the attribute information extracting section 305 extracts, based on a control signal of the lens control section 301, the focus distance and the zoom scale as attribute information. The attribute information extracting section 305 detects, based on a detection signal of the attitude detecting section 206, the camera attitude (acceleration speed, angular velocity, and elevation angle/depression angle, etc.), and extracts the camera work of the video camera 100A, such as pan and tilt, etc. at the time of shooting as the attribute information from the camera attitude. Furthermore, based on the camera work, a portion (i.e., a portion which was shot with the video camera 100A standing still) shot by fixed-point shooting after performing the camera work can be extracted as the attribute information. Thus, there are cases where the attribute information extracting section 305 extracts the attribute information from an input signal itself, and also cases where the attribute information extracting section 305 combines input signals together or analyzes an input signal, and thereby extracts the attribute information.

The scene evaluation section 306 evaluates, based on the attribute information extracted by the attribute information extracting section 305, a video picture in a portion containing the attribute information, and gives an evaluation (value) to the portion. The evaluation will be described in detail later.

The playback information generating section 307 selects, based on the evaluation given by the scene evaluation section 306, a portion (scene) to be played back, and generates information (which will be hereinafter referred to as "playback information") to specify the portion to be played back as a digest. Note that the playback information will be described in detail later.

The multiplexing section 308 multiplexes coded video picture data from the video picture signal compressing section 204, the coded sound data from the sound signal compressing section 210, and the playback information from the playback information generating section 307 to output multiplexed data. The data multiplexed by the multiplexing section 308 is stored in the memory section 330. As a multiplexing scheme, for example, there is a technique such as TS (transport stream) of MPEG, etc. However, the multiplexing scheme is not limited thereto. Note that in this embodiment, a case where the above-described data is multiplexed is shown as an example, but the data does not have to be multiplexed.

The processing by the attribute information extracting section 305, the scene evaluation section 306, the playback information generating section 307, and the multiplexing section 308 are sequentially executed at the time of shooting, i.e., specifically, during or immediately after shooting.

The digest playback section 309 executes digest playback based on an input by the user after shooting. Specifically, the digest playback section 309 reads the multiplexed data stored in the memory section 330, and outputs, according to the playback information, the coded video picture data and the coded sound data corresponding to a portion of the multiplexed data to be played back as a digest respectively to the video picture signal stretching section 211 and the sound signal stretching section 213. The coded video picture data and the coded sound data which have been output are decoded by the video picture signal stretching section 211 and the sound signal stretching section 213, respectively, and are output from the video picture display section 212 and the sound output section 214. Thus, digest playback of a specific portion extracted from a video picture is executed. Note that the digest video picture may be stored in the memory section 330.

2. Scene Evaluation and Generation of Playback Information

Figure 3:
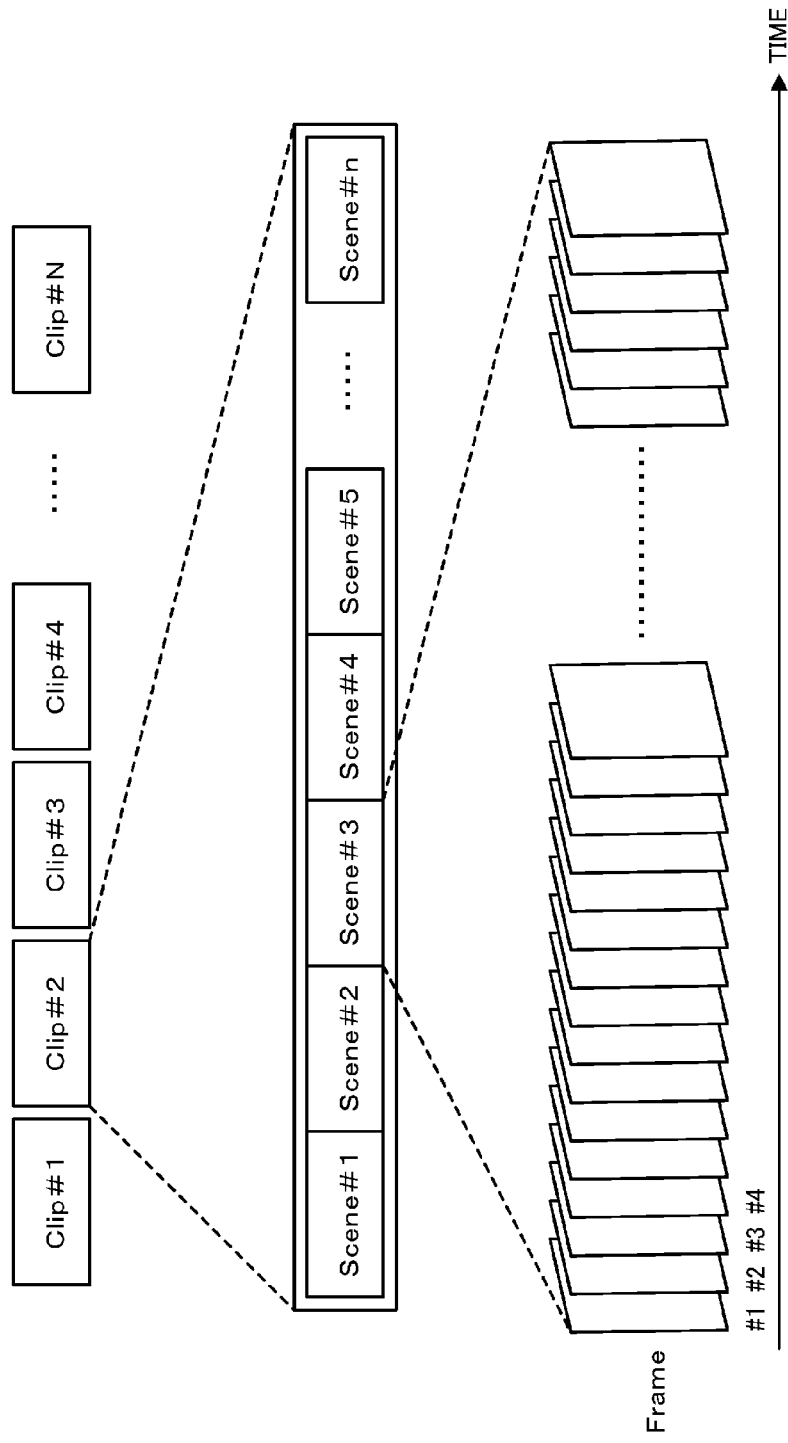
FIG. 3 is a diagram illustrating a configuration of a video picture shot by the video camera.

FIG. 3 is a diagram illustrating a configuration of a video picture shot by the video camera 100A. FIG. 4 is a chart showing an example case where a clip is divided into a plurality of scenes. In FIG. 4, each scene is specified by a "start time" and an "end time," but may be specified by frame numbers (i.e., a start frame number of the scene and an end frame number of the scene), etc.

An unit of a video picture shot in a period from a time when a user puts an instruction to start shooting to a time when the user puts an instruction to end or pause shooting is "clip." That is, if the user repeats a start of shooting and an end or pause of shooting many times, a plurality of clips are generated. A single clip is made up of a single "scene" or a plurality of "scenes." A "scene" is a continuous video picture in which a narrative occurs, and is made of a single "frame" or a plurality of "frames." A "frame" is an individual image regarded as a minimum unit forming a video picture.

For example, a single "clip" can be considered as a single "scene." Also, the "scene" may be set by using, as a boundary between scenes, timing at which a screen image significantly changes. For example, the video picture analysis section 303 calculates a motion vector between frames, and a point where the magnitude of the motion is larger than a predetermined value may be a boundary between "scenes." That is, a video picture between two boundaries set in the above-described manner form a single "scene." "Scenes" may be divided from one another based on other shooting information, etc. For example, "scenes" may be divided from one another according to button inputs by the user who is shooting a video picture. In such a case, a "scene" or "scenes" in a clip is or are created with a clear intention of the user. When "scenes" are extracted by the above-described method, as shown in FIG. 4, a "clip" includes continuous "scenes." On the other hand, a specific portion in a "clip" can be assumed to be a "scene." For example, a portion of a video picture, which is important for the video picture can be considered as a "scene." Specifically, a portion containing particular attribute information may be considered as a "scene." For example, a video picture containing attribute information which is considered to be important and has a predetermined time width is set as a "scene." Thus, only an important portion is extracted as a "scene." As a result, a "clip" discretely includes "scenes." As described above, a "scene" or "scenes" can be arbitrarily set. Thus, in this embodiment, only an important portion is considered as a "scene."

Subsequently, scene evaluation by the scene evaluation section 306 will be described in detail. FIG. 5 is a table of correspondence data between various attribute information items and evaluations for the associated attribute information items, which is used in evaluating a video picture. The table is stored in the memory section 330. The scene evaluation section 306 uses the table to evaluate a video picture.

As shown in FIG. 5, an evaluation value is set for each attribute information. In the example of FIG. 5, the higher the evaluation value is, the higher (more preferable) evaluation becomes. For example, since it is presumed that clip-in (a shooting start portion) and clip-out (a portion immediate before an end of shooting) are an introduction portion or an important portion of a video picture and logical meanings that the video picture has is highly important in the portions, an evaluation value of "100" is set for the clip-in (A), and an evaluation value of "90" is set for the clip-out (F). As the camera work during shooting, zoom-up (D) and zoom-down (G) draws more attentions to a particular subject, and thus, an evaluation value of "30" is set for each of the zoom-up (D) and the zoom-down (G). Also, since a shooting target is a person in many cases, an evaluation value of "50" is set for face detection (Z). More specifically for face detection, an evaluation value of "100" is set for face detection of a particular person A (X), and an evaluation value of "80" is set for face detection of a particular person B (Y).

A face of a particular person and the evaluation value thereof, which will be described in detail later, can be set by the user. That is, when the user is not merely shooting a video picture of an arbitrary person but shooting a video picture of a particular person, a high evaluation value can be given to the video picture based on the user's own will. Note that not only a positive evaluation, i.e., a favorable evaluation, but also a negative evaluation, i.e., an unfavorable evaluation may possibly be given. For example, an image blur in a video picture might cause the video picture to be hard to see by a viewer, and therefore, a negative evaluation value is given to a scene having such attribute information.

Note that in the example of FIG. 5, the evaluation is quantified. However, how to represent the evaluation is not limited thereto. For example, marks such as A, B, C, . . . may be used to represent evaluations. Relative merits of such marks used for evaluation are determined in advance (for example, the evaluation of A is the best, etc.). Evaluation represented by marks such as A, B, and C, etc. can be freely set based on user's own will.

The scene evaluation section 306 gives, based on the table, an evaluation value corresponding to the attribute information to a portion of a video picture, from which the attribute information has been extracted by the attribute information extracting section 305.

Then, after giving the evaluation value, the scene evaluation section 306 extracts a predetermined number of scenes, based on the evaluation value. Thus, the scene evaluation section 306 extracts, as scenes, the greater number of feature potions which can be used for digest playback than that of scenes to be played back as a digest, in advance. For example, the scene evaluation section 306 extracts, as a scene, a video picture having a predetermined time width including a portion having attribute information whose evaluation value is high. Then, the scene evaluation section 306 extracts a predetermined number of scenes in descending order of the evaluation values. The predetermined number may be arbitrarily set by the user, or may be determined as a fixed value in advance. The above-described method for extracting a scene is merely an example, and a scene may be extracted by a different method. For example, even a portion having the attribute information whose evaluation is high does not have to be extracted, if a portion having the same attribute information has been extracted as a scene in a previous video picture. Thus, it is possible to prevent a case where only scenes having the same attribute information are extracted. As another option, a portion having particular attribute information (for example, face detection of a person A and face detection of a person B, etc.) may be preferentially extracted.

Next, the scene evaluation section 306 extracts, based on a predetermined extraction condition, a scene which is to be played back as a digest from the extracted scenes. For example, if the extraction condition is that three scenes in descending order of the evaluation values from the highest evaluation value are extracted, the scene evaluation section 306 extracts three scenes having top three evaluation values. The number of scenes which are to be extracted can be arbitrarily set by the user. If the extraction condition is that scenes are extracted in descending order of the evaluation values from the highest evaluation value and a total time of the extracted scenes is a predetermined time, the scene evaluation section 306 extracts scenes in descending order from the highest evaluation value so that the total time of the extracted scenes is the predetermined time. The predetermined time may be set in advance, or may be arbitrarily set by the user. Also, if the extraction condition is that a scene having an evaluation value equal to or higher than a predetermined value is extracted, the scene evaluation section 306 extracts scenes having an evaluation value equal to or higher than the predetermined value regardless of the number and the total time of extracted scenes. The predetermined value can be arbitrarily set by the user. Thus, the scene evaluation section 306 can extract a scene based on a given evaluation value in various different views. Note that the extraction condition may be arbitrarily set by the user, or may be set in advance.

Note that when a single scene has a plurality of items for the attribute information, evaluation values given to contents of the plurality of attribute information items may be added together and the obtained value may be used as an evaluation value of the scene. As another option, one of the plurality of attribute information items which has the highest evaluation value may be used as an evaluation value of the scene. As still another option, an average value of evaluation values of the plurality of attribute information items may be used as an evaluation value of the scene.

The table for the attribute information and the evaluation value is not limited to only one provided to the video camera 100A. Specifically, the video camera 100A may be configured to have a plurality of tables for the attribute information and the evaluation value, and to appropriately select one of the tables which is to be used in scene evaluation. For example, the video camera 100A may be configured to select an optimum table from the plurality of tables for the attribute information and the evaluation value according to a shooting mode (for example, a landscape mode, a portrait mode, a shorts mode, and a still mode, etc.). Also, as a configuration in which a proper table is appropriately set according to a shooting condition as described above, when a table is not prepared in advance in a one-to-one correspondence to each shooting condition but less tables than shooting conditions are prepared, two or more of the tables may be combined (for example, respective evaluation values may be added together at a certain ratio, etc.) according to the shooting condition. In such a case, a table corresponding to the shooting condition may be set by varying weighting between the tables combined (for example, the ratio when the evaluation values are added together) when the tables are combined.

Figure 6:
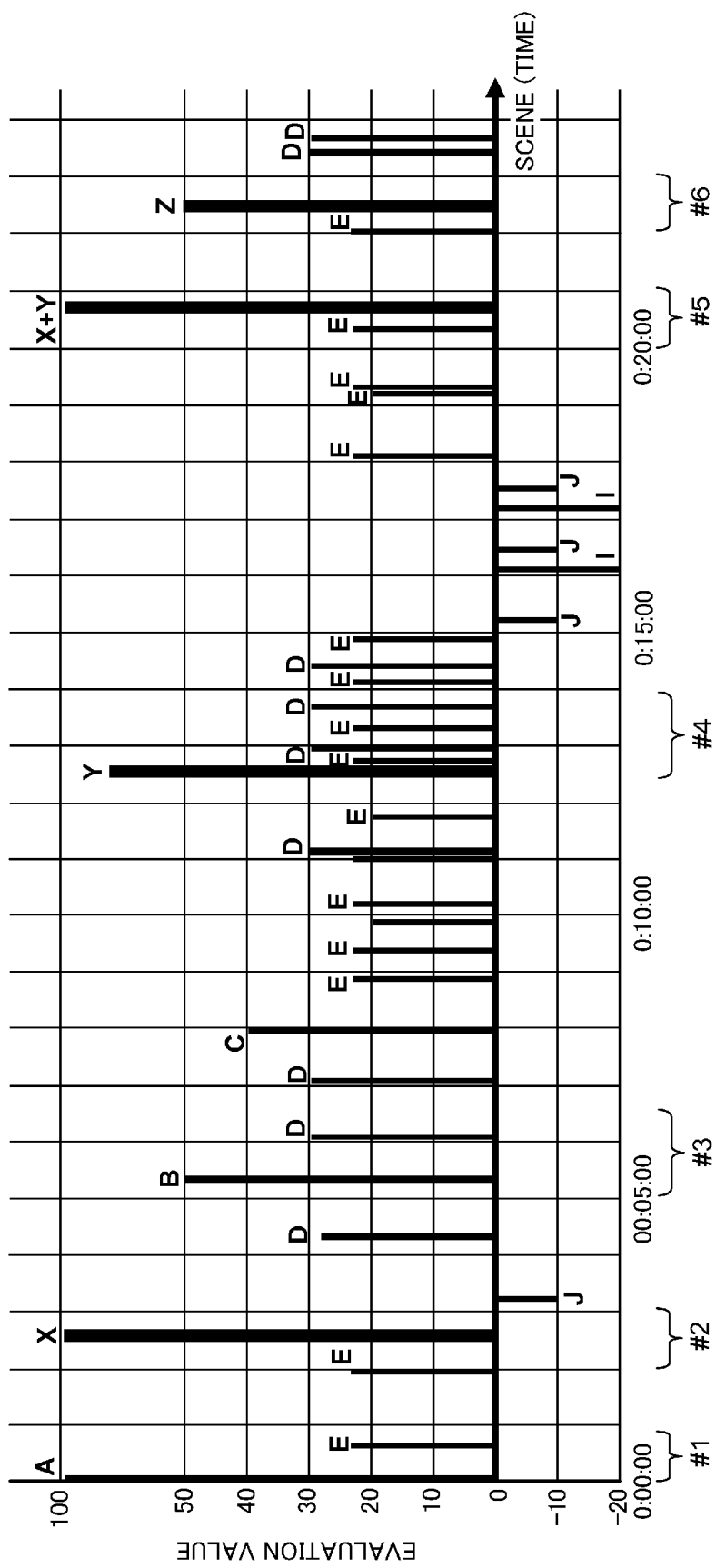
FIG. 6 is a chart showing results obtained by extracting attribute information from a video picture and giving an evaluation value to the attribute information by a scene evaluation section.

Processing performed by the scene evaluation section 306 will be described below using a specific example. FIG. 6 is a chart showing results obtained by extracting attribute information from a video picture and giving an evaluation value to the attribute information by the scene evaluation section 306. In FIG. 6, the horizontal axis indicates time (scene), and the vertical axis indicates the evaluation value.

In FIG. 6, a portion around a time 0 has the attribute information A of the "clip-in" which means it is immediately after a start of shooting, and an evaluation value of "100" is given thereto.

A portion having the attribute information B is a portion where a particular sound was extracted. Extraction of the particular sound is performed by the sound analysis section 304. An evaluation value of "50" is given to the portion having the attribute information B.

A portion having attribute information C is a portion where, after panning and tilting the video camera 100A, the user held the video camera 100A still and shot a video picture. Since it can be determined that a portion after a camera work such as panning and tilting, etc. has a high value as a video picture, still shooting after such a camera work is set as the attribute information. An evaluation value of "40" is given to the portion having the attribute information C.

A portion having attribute information D is a portion where zoom-up or zoom-down, etc. was performed, and then, a shooting was performed. When zoom-up or zoom-down is performed, some kind of user's intention for shooting is reflected, and zoom-up or zoom-down can be determined to be important. Therefore, zoom-up and zoom-down are set as the attribute information. An evaluation value of "30" is given to the portion having the attribute information D. The evaluation value may differ between zoom-up and zoom-down. For example, since it is determined that the user intended more particularly to pay attention to a shooting target when zoom-up was performed than when zoom-down was performed, the evaluation value may be set higher for zoom-up.

A portion having attribute information E is, unlike the attribute information C, a portion where shooting was performed while the video camera 100A was panned and tilted, etc. Since it can be determined that a camera work such as panning and tilting, etc. reflects user's shooting intention to shoot a target while following the target, a camera work is set as the attribute information. An evaluation value of "25" is given to the portion having the attribute information E.

A portion having attribute information I is a portion where a video picture includes an image blur. In this case, the video picture shakes, and thus, the video picture tends to be hard to see by a viewer. Therefore, a negative evaluation value is given. Specifically, an evaluation value of "−20" is given to the portion having the attribute information I.

A portion having attribute information J is a portion where the ground, etc. was shot. This often happens when the user has not pressed a shooting stop button, continues shooting, and walks holding the video camera 100A in his/her hand. In this case, since it can be determined that user's particular intention is not reflected on a video picture, a negative evaluation value is given. Specifically, an evaluation value of "−10" is given to the portion having the attribute information J.

A portion having attribute information X is a portion including a face of a person A. The video picture analysis section 303 recognizes that a subject included in a video picture which has been shot is a face of a person, and further determines whether the recognized face matches a face of any particular person which has been stored in the memory section 330, etc. in advance. The scene evaluation section 306 can extract the portion including the face of the particular person from the video picture based on the result of the video picture analysis section 303. An evaluation value of "100" is given to the portion having the attribute information X.

A portion having attribute information Y is a portion including a face of a person B. Similar to the face of the person A, the face of the person B is registered in the memory section 330, etc. in advance. An evaluation value of "80" is given to the portion having the attribute information Y.

A portion having attribute information Z is a portion including a face of a person, but the face does not match a face of any person which has been stored in advance. An evaluation value of "50" is set for the portion having the attribute information Z.

Figure 7:
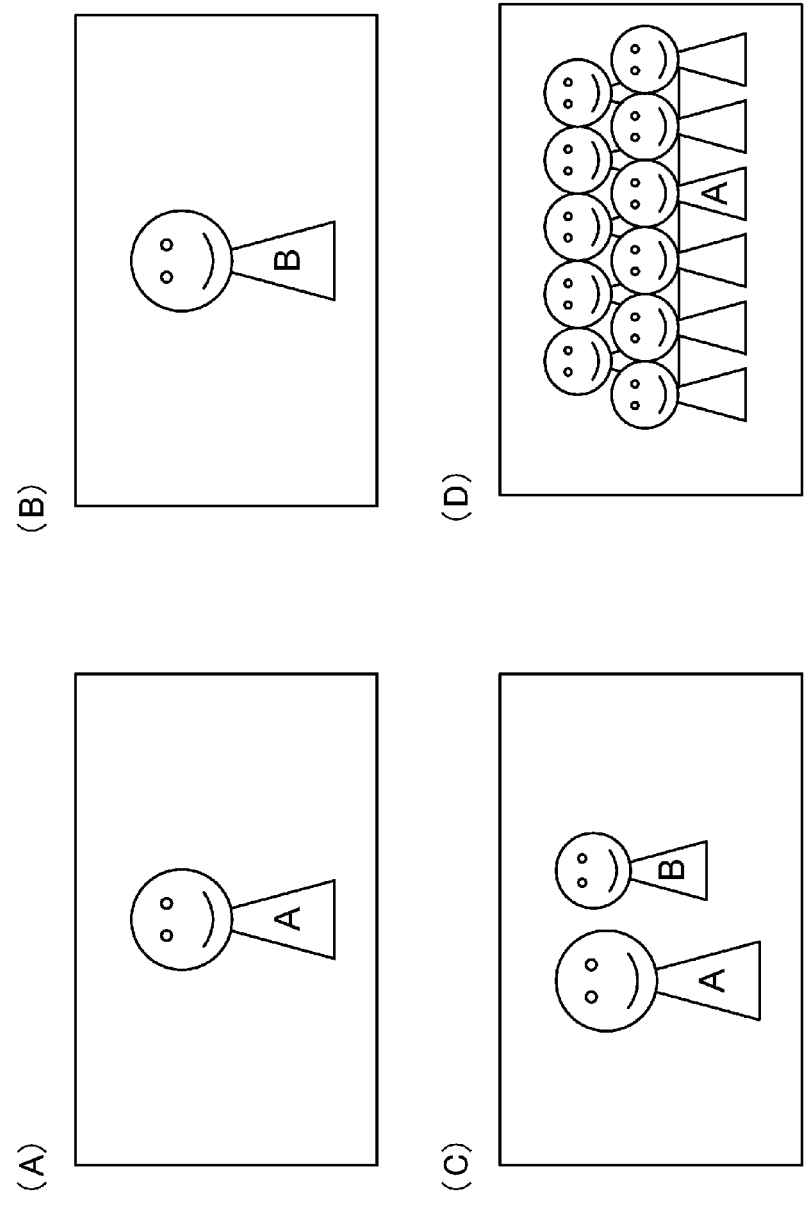
FIGS. 7A-7D are views showing examples of video pictures including a face of a person and faces of people.

Note that as example video pictures including a face of a person and faces of people are shown in FIGS. 7(A)-7(D). As shown in FIGS. 7(A) and 7(B), when a video picture includes a face of a person registered in a table in advance, the scene evaluation section 306 gives an evaluation value set in the table in advance (in the example of FIG. 5, an evaluation value of "100" is given for the face of the person A, and an evaluation value of "80" is given for the face of the person B).

As shown in FIG. 7(C), when a video picture includes both of the faces of the person A and the person B, the scene evaluation section 306 may give the higher one of evaluation values for the faces of the person A and the person B. When the table of FIG. 5 is used, a higher evaluation value is given for the face of the person A than that for the face of the person B, and thus, "100" which is the evaluation value for the face of the person A is an evaluation value to be given. Note that a portion to which a code X+Y is put includes both of the faces of the person A and the person B. As another method, an average value of the evaluation values may be used as an evaluation value. In the example of FIG. 5, the evaluation value is "90" based on (100+80)/2. As a still another method, distribution ratio may be set for each of the evaluation values to add the evaluation values together. For example, the distribution ratio may be set for each of the evaluation values so that the larger a face in a video picture is, the higher the distribution ratio becomes. In the example of FIG. 7(C), if the ratio between the size of the face of the person A and the size of the face of the person B is 5:3, the evaluation value is "92.5" based on (100×5+80×3)/8. It is highly possible that the size of a face on a video picture reflects a distance from a camera to a subject, and according to this method, a larger distribution ratio is set to a closer subject, thereby increasing an influence of the closer subject. The distribution ratio for each of the evaluation values may be set according to a distance of an associated one of a center position of the face of the person A and a center position of the face of the person B from a center of a screen or a salient region of the screen. Specifically, the distribution ratio of each of the evaluation values may be set so that the closer the distance is, the higher the distribution ratio becomes. The salient region is an image region drawing attention, such as an image region where a memorial statue, a pet, or a sign, etc. is positioned.

In an example of FIG. 7(D), a video picture includes a large number of people (a larger number of people than a predetermined number) as subjects. In this example, although the video picture includes the face of the person A, the face of the person A is small on the screen and is with many other people, and thus, it might be difficult to distinguish the face of the person A from faces of the other people. In such a case, according to the number of people included in the video picture, the distribution ratio may be set for the evaluation value of the face of the person A and the evaluation value of the faces of the other people, and the evaluation values may be added together at the distribution ratio. In the example of FIG. 7(D), there are ten people other than the person A, who cannot be recognized. Therefore, an evaluation value of "54.5" is given based on (100×1+50×10)/11.

For face detection, information such as the position of the face on the screen, the size of the face, the direction in which the face faces, the level of smile, information concerning whether eyes are opened or closed, information concerning the level of emotion of the face shown in the video picture may be evaluated, and then, the evaluation value may be increased/reduced according to the information.

Thus, an evaluation value is given to a portion of a video picture where attribute information is extracted, and then, the scene evaluation section 306 extracts six scenes in a descending order from the highest evaluation value. In FIG. 6, labels #1-#6 are put to the six scenes in a chronological order. Subsequently, the scene evaluation section 306 extracts, based on an extraction condition that three scenes in a descending order from the highest value are extracted, scenes #1, #2, and #5 having the top three evaluation values as scenes to be played back as a digest.

Next, the generation of playback information by the playback information generating section 307 will be described in detail. The playback information generating section 307 generates, according to a scene extracted by the scene evaluation section 306, playback information which is information to specify a scene which is to be played back as a digest. For example, as shown in FIG. 8, the playback information may be identified by a start time and an end time of a scene to be played back. In this case, it is effective in search of a reference image that a representative frame (a frame in a scene having the highest evaluation) of each scene is stored additionally. Note that the playback information is not limited to the foregoing and, for example, a scene which is to be played back may be identified by a frame number. As another option, the position (place) of a scene to be played back in multiplexed data generated by the multiplexing section 308 may be used to be the identified scene. When a technique such as TS, etc. is used for multiplexing, playback information may be generated by using time information, etc. such as PTS and DTS, etc. When a video picture data is recorded using a standard such as AVCHD (Advanced Video Codec High Definition), etc., a method in which playback information is recorded in Play List File, etc. may be used.

Figure 9:
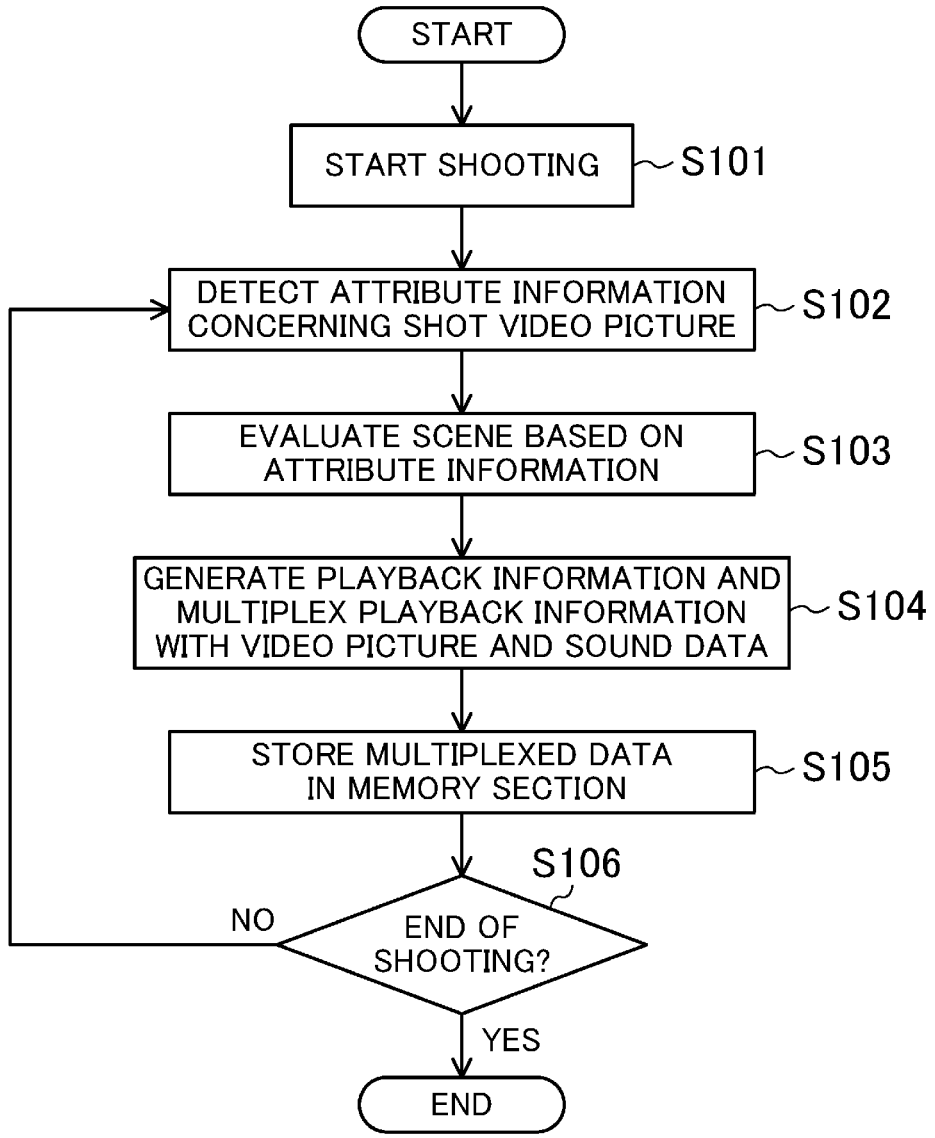
FIG. 9 is a flowchart showing a flow of processing of shooting, scene evaluation, playback information generation, and recording.

FIG. 9 is a flowchart showing a flow of processing of shooting, scene evaluation, playback information generation, and recording.

First, the control section 300 of the video camera 100A starts shooting in Step S101. Shooting is started based on an input from the external input section 207 such as an input button, etc.

Next, in Step S102, the attribute information extracting section 305 detects attribute information of a video picture, based on a detection result of the attitude detecting section 206, control information of the lens control section 301, and analysis results of the video picture analysis section 303 and the sound analysis section 304, etc.

In Step S103, the scene evaluation section 306 gives an evaluation value to each portion of the video picture, based on the attribute information extracted by the attribute information extracting section 305. Thereafter, the scene evaluation section 306 extracts several feature scenes, and further extracts scenes which are to be played back as a digest from the several feature scenes.

Subsequently, in Step S104, the playback information generating section 307 generates playback information based on the scenes which have been extracted by the scene evaluation section 306 as scenes which are to be played back as a digest. Then, a multiplexing section 314 multiplexes the generated playback information with coded video picture data and coded sound data.

In Step S105, the control section 300 stores the multiplexed data in the memory section 330.

In Step S106, the control section 300 determines whether or not an end of shooting is input. If an end of shooting has not been input, the process returns to Step S102, and the shooting is continued. On the other hand, if an end of shooting has been input, the shooting is terminated.

3. Digest Playback Based on Playback Information

The digest playback section 309 reads playback information stored in the memory section 330, and performs digest playback based on the playback information. Specifically, the digest playback section 309 extracts a scene corresponding to a relevant portion from video picture and sound information stored in the memory section 330, based on information such as a start time and an end time, etc. of an each individual scene indicated in FIG. 8, which is to be played back as a digest.

Figure 10:
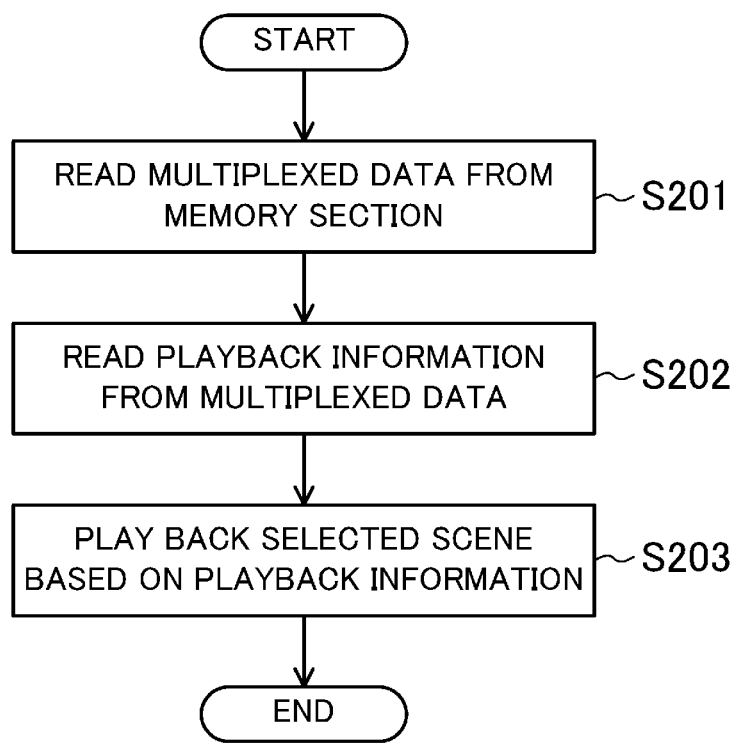
FIG. 10 is a flowchart showing a flow of processing during digest playback.

FIG. 10 is a flowchart showing a flow of processing during digest playback.

First, in Step S201, the digest playback section 309 reads multiplexed data stored in the memory section 330.

Next, in Step S202, the digest playback section 309 decomposes the read multiplexed data, and extracts playback information.

Then, in Step S203, the digest playback section 309 outputs, based on the extracted playback information, coded video picture data and coded sound data which are to be played back to the video picture signal stretching section 211 and the sound signal stretching section 213, and plays back a video picture and a sound via the video picture display section 212 and the sound output section 214.

Thus, digest playback in which only a particular scene or scenes is or are extracted from a video picture is executed.

4. Input of Attribute Information and Evaluation Value

Subsequently, input of attribute information and an evaluation value by the user will be described. In the video camera 100A of this embodiment, the user can input attribute information and an evaluation value in a table one by one specifically.

For example, the detection of the face of the person A and the detection of the face of the person B as described above are additionally set by the user. That is, the user registers detection of the face of the person A as new attribute information in a table provided in the video camera 100A in advance, and also registers an evaluation value for the attribute information. Furthermore, the user registers the face of another person, i.e., the person B as new attribute information, and also registers an evaluation value for the attribute information. Thus, not only simple detection of a face of a person can be merely performed, but also further detail detection of a face of a particular person can be performed.

In this case, a face recognition table is stored in the memory section 330 in advance. The face recognition table is configured so that an ID, a face image, a name of a person, and an evaluation value make one set, and a plurality of sets (for example, six sets) can be registered. Furthermore, the ID and the evaluation value are set in advance, and the user registers a face and a name of a particular person appropriately.

Specifically, when the video camera 100A is set to a registration mode by an operation of the external input section 207, the control section 300 causes the video picture display section 212 to display a message to encourage the user to shoot a face of a person which is to be registered for a predetermined time (for example, three seconds) or more. When the user shoots, in response to the message, the face of the particular person for the predetermined time or more with the video camera 100A, the face of the person is recognized as new attribute information which is to be registered, and is temporarily stored in the memory section 330. Thereafter, the control section 300 causes the video picture display section 212 to display a message to ask which ID in the face recognition table applies to the face of the person. Note that an evaluation value is already set for each ID. For example, the evaluation values are set so that an evaluation value for ID1 is "100," which is the highest evaluation value for ID1-ID6, and the larger the ID number is, the smaller the evaluation value becomes. That is, causing a face of a person which is to be registered and ID to correspond each other is tantamount to setting an evaluation value for the face of the person. After the user selects a corresponding ID, the control section 300 next causes the video picture display section 212 to display a massage to encourage the user to input the name of the person. Thus, the ID, the face image and the name of the particular person, and the evaluation value are set in the face recognition table. Note that, in this example, evaluation values are set in advance, but the table may also be configured so that the user can arbitrarily input evaluation values. In such a case, the video camera 100A may be configured so that a message to encourage the user to input an evaluation value is displayed on the video picture display section 212 to invite the user to input the evaluation value.

Thus, the user can arbitrarily set a content of each of the attribute information and the evaluation value.

Correspondence data between the attribute information and the evaluation value is used in various manner, based on selection of the user. For example, in the above-described example, the detection of the face of the person A, the detection of the face of the person B, and the detection of the face of the other person are individually set as the attribute information. However, it is also possible to extract, as the attribute information, a simple detection of a face of a person without identifying whose face the detected face is. That is, the video camera 100A has a normal mode in which information that a face of a person has been detected is simply extracted as the attribute information without identifying whose face the detected face is, and a specific mode in which information that a face of a particular person has been detected is extracted as the attribute information. In the specific mode, a face which is to be detected as the attribute information can be selected from faces of people which have been registered. Specifically, the control section 300 causes the video picture display section 212 to display images of faces, names or IDs of the people which have been registered. In response, the user operates the video picture display section 212 to select a face of a person which is to be extracted as the attribute information. The control section 300 extracts the face of the person selected by the user as the attribute information.

Furthermore, a condition under which face detection is extracted as the attribute information may differ between the normal mode and the specific mode. Specifically, in the normal mode, when shooting of a face of an arbitrary person continues for a first predetermined time or more in a video picture, the detection of the face is extracted as the attribute information. In contrast, in the specific mode, when shooting of a face of a particular person (for example, the person A) continues for a second predetermined time, which is shorter than the first predetermined time, or more (for example, when the face is being shot only in one frame) during shooting, the detection of the face is extracted as the attribute information. That is, in the normal mode, based on the idea that the importance level for a person as a shooting target is in general higher than that for a landscape, etc., detection of a face is set as the attribute information. Therefore, it is set as a necessary condition that a face of a person has been shot for a time which is long enough that it can be determined that the face of the person has been shot as a shooting target, not for only a moment. In contrast to the normal mode, in the specific mode, rather than whether a face of a particular person is more important than some other shooting target such as a landscape, etc, a clear and strong intention of the user to extract a video picture including a particular person is reflected. Therefore, the important level for face detection in the specific mode is higher than that in the normal mode. Thus, in the specific face detection mode, a condition for determining that a face is detected is set easier than in a normal face detection mode.

Note that the importance level for a face of a particular person may be increased by increasing an evaluation value for the face of the particular person to a higher value than an evaluation value for a face of an arbitrary person, without changing the condition for face detection.

Figure 12:
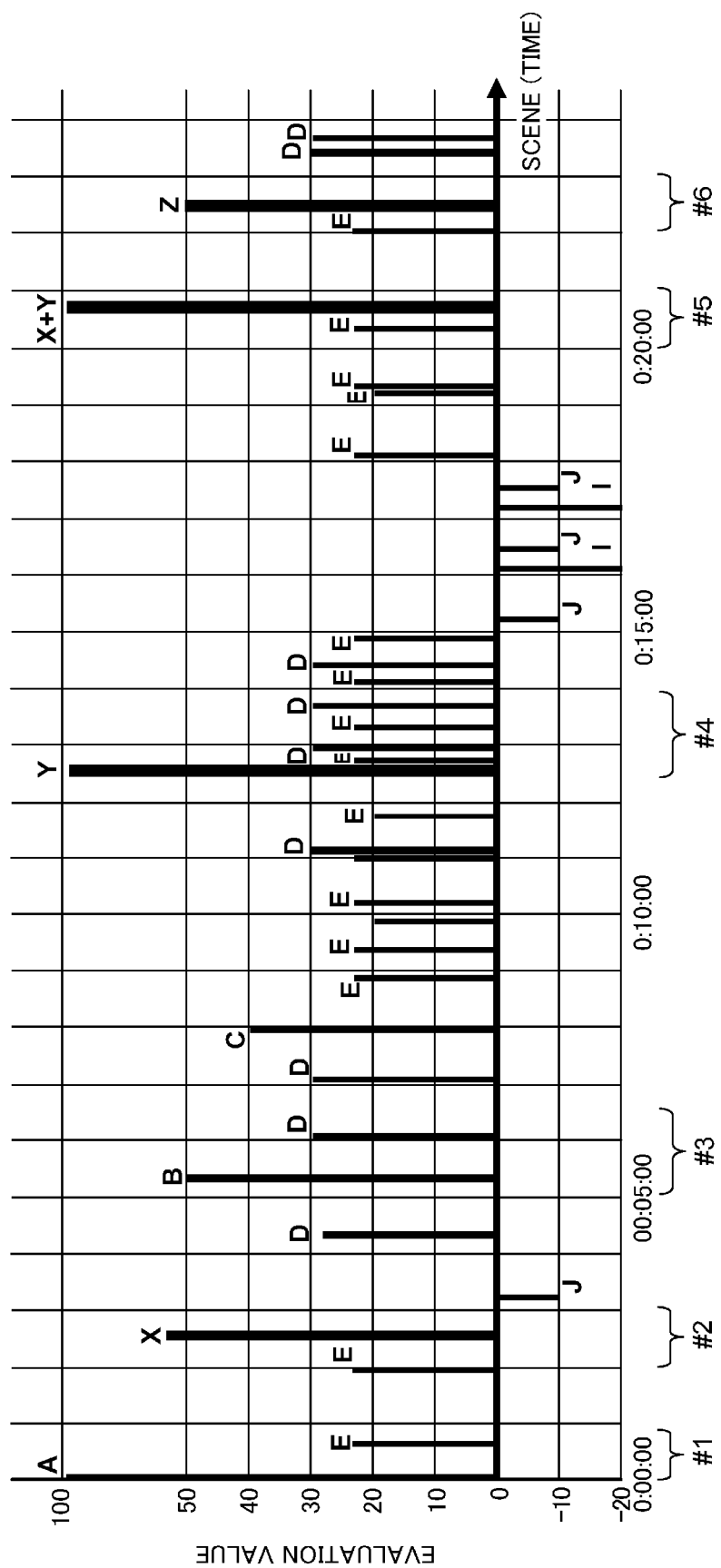
FIG. 12 is a chart showing results obtained by extracting attribute information from a video picture based on the table of FIG. 11 and giving an evaluation value to the attribute information by the scene evaluation section.

Subsequently, a case where an evaluation value for detection of the face of the person A is set higher than that for detection of the face of the person B will be described. FIG. 11 is a table of correspondence data between various attribute information items and evaluations for the associated attribute information items, which is used in evaluation of a video picture. FIG. 12 is a chart showing results obtained by extracting attribute information from a video picture based on the table of FIG. 11 and giving an evaluation value to the attribute information by the scene evaluation section 306. In FIG. 12, the horizontal axis indicates a time (scene), and the vertical axis indicates an evaluation value. FIG. 13 is a chart showing playback information generated from an evaluation based on the table of FIG. 11.

As shown in FIG. 11, the evaluation value for the attribute information of detection of the face of the person A is "60", whereas the evaluation value for the attribute information of detection of the face of the person B is "90." When a video picture is evaluated using this table, the results shown in FIG. 12 are obtained. Specifically, as compared to the evaluation using the table of FIG. 5, the evaluation of Scene #2 is reduced, and the evaluation of Scene #4 is increased. When playback information is generated based on the evaluation values, as shown in FIG. 13, Scene #4 is added to a digest, instead of Scene #2.

Figure 14:
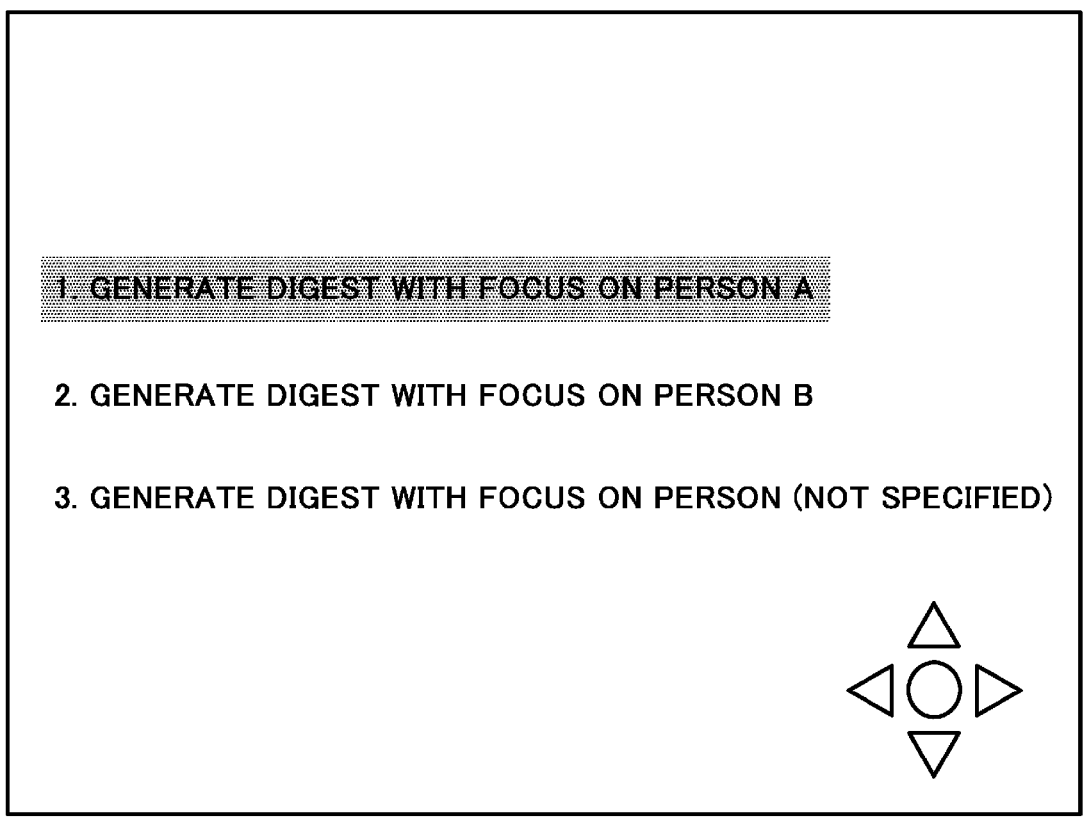
FIG. 14 is a view showing an example selection screen by which a user is invited to select a mode corresponding to each table.

To change the evaluation value as described above, the user may rewrite the evaluation values in the table, or different tables including different evaluation values (tables of FIG. 5 and FIG. 11) may be prepared in advance to switch between the tables. For example, as a method for switching between the tables which have been prepared in advance, the video picture display section 212 may be caused to display a selection screen (see FIG. 14) which allows the user to select one of modes corresponding to various different tables, thereby inviting the user to select a mode via the external input section 207. As another option, the video picture display section 212 may be caused to display various tables to invite the user to select a table. Note that tables which are to be prepared in advance may be created in advance by direct input of attribute information or evaluation values by the user.

As described above, a digest according to use's preference can be generated by changing the evaluation of attribute information according to user's preference.

5. Conclusion

Based on the foregoing, according to this embodiment, digest playback reflecting user's preference can be performed by allowing the user to arbitrarily input at least one of the attribute information or the evaluation.

In particular, in this embodiment, the user can set additional attribute information, and thus, a video picture matching user's preference much more can be player back as a digest.

Specifically, the video camera 100 includes the external input section 207 configured to receive attribute information concerning a video picture according to an input operation by the user, and the control section 300 configured to extract the attribute information from a video picture in order to extract a portion of the video picture which is to be played back as a digest from the video picture. Thus, the user can appropriately input the attribute information which is to be used for extracting a portion of a video picture which is to be played back as a digest from the video picture. As a result, a video picture matching user's preference can be played back as a digest.

The video camera 100 includes the external input section 207 configured to receive, according to an input operation by the user, for the correspondence data between attribute information concerning a video picture and an evaluation for the attribute information, at least one of the attribute information or the evaluation, and the control section 300 configured to extract the attribute information from a video picture and evaluate the portion of the video picture having the attribute information based on the correspondence data in order to extract a portion of the video picture which is to be played back as a digest from the video picture. Thus, the user can appropriately input the attribute information and/or the evaluation value for the attribute information used in extracting a portion of a video picture which is to be played back as a digest from the video picture. As a result, a video picture matching user's preference can be played back as a digest.

Also, for attribute information of face detection (face detection without specifying a particular person) which has been set in advance, subordinate attribute information, i.e., face detection of a particular person can be set. Thus, digest playback which reflects a stronger preference of the user can be performed.

Furthermore, as the attribute information, fixed attribute information is set for attribute information, such as clip-in, clip-out, and zoom-up, etc., in which user's preference is hardly reflected, and changeable attribute information is set for attribute information, such as face detection of a particular person, in which user's preference is easily reflected, and thus, processing can be simplified. That is, if attribute information are all changeable, contents of control (input of attribute information, and extraction of attribute information, etc.) and memory capacitances corresponding to various attribute information have to be prepared, and thus, processing becomes complicated. In contrast, the number of changeable items of attribute information is limited to a certain number, so that the contents of control and the memory capacities which are to be prepared in advance can be reduced, and processing can be simplified. Also, some users want to strongly reflect their preferences, and other users do not want to reflect their preferences so much (feel troublesome to perform such operations). Thus, since a video camera is configured so that several items of attribute information are not variable but fixed, and selection of digest playback based on only the fixed attribute information is allowed, preferably for the latter users, troublesome operations can be eliminated, and thus, an easy-to-use video camera can be provided. On the other hand, since a user can also input (add or change) a portion of the attribute information according to his/her preference, preferably for the former users, digest playback which reflects user's preference can be performed. That is, a video camera which is user friendly to various users and also can perform digest playback which reflects user's preferences can be provided.

In the video camera 100A, since extraction of attribute information, scene evaluation, generation of playback information are performed at the time of shooting, processing which is to be performed at the time of digest playback can be reduced, and thus, digest playback can be executed simply and quickly. Moreover, it is difficult, or possible but troublesome to determine the attribute information such as the attitude of the video camera 100A, etc., based on a video picture afterward, and such attribute information can be detected more easily by a detection signal of a sensor at the time of shooting, etc. That is, several items of attribute information can be easily detected at the time of shooting. Therefore, attribute information is extracted at the time of shooting, so that such attribute information can be easily extracted.

Furthermore, a video picture recorded in an imaging apparatus such as the video camera 100A is a video picture which has been merely shot and has not been edited. Therefore, the video picture includes many less important portions, and the above-described digest playback is very effective.

Second Embodiment

Figure 15:
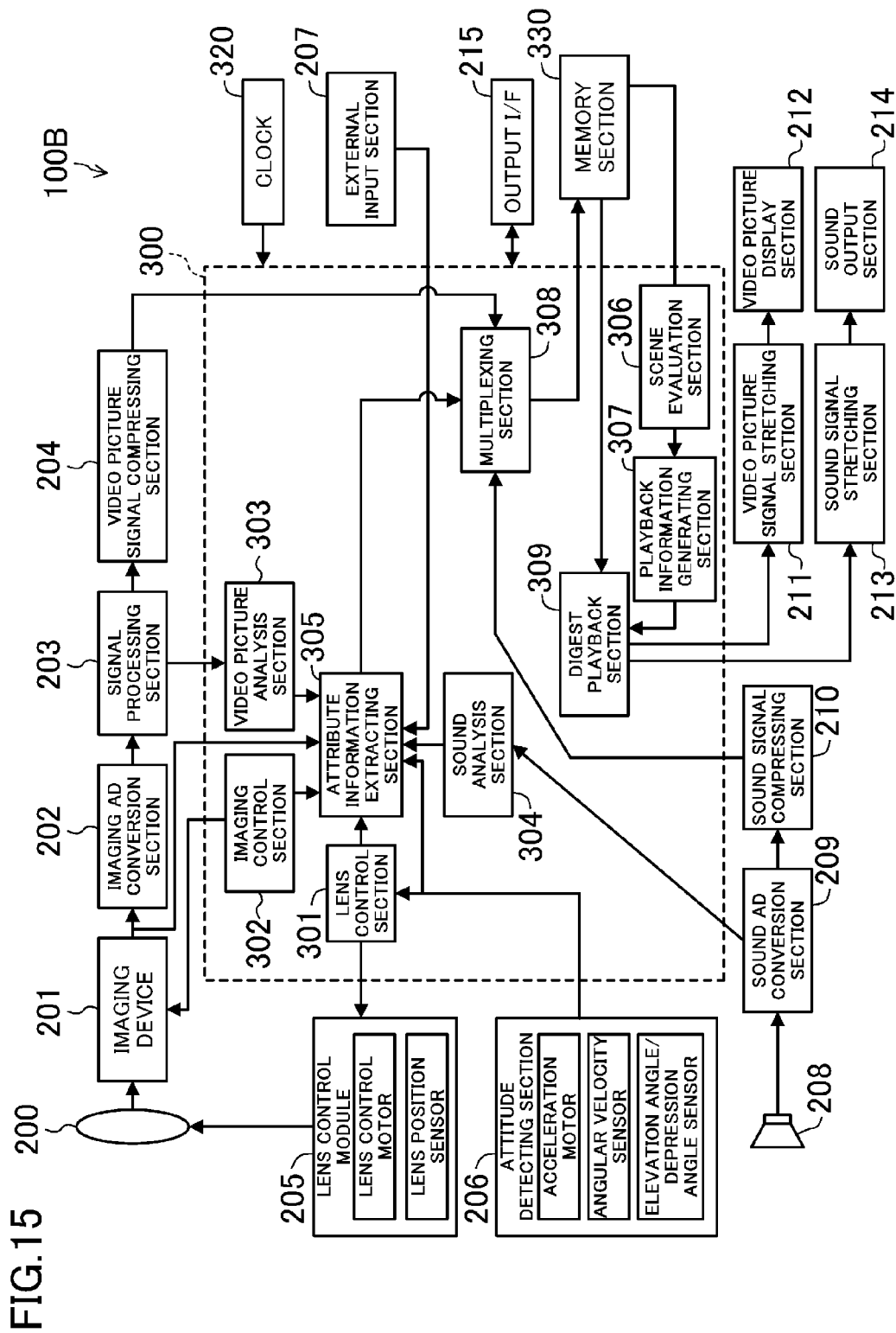
FIG. 15 is a block diagram schematically showing a configuration of a video camera according to a second embodiment.

Subsequently, a video camera 100B according to a second embodiment will be described with reference to FIG. 15. FIG. 15 is a block diagram schematically illustrating a configuration of the video camera 100B. The video camera 100B is different from the video camera 100A of the first embodiment in that a scene which is to be played back is selected when digest playback is performed. Specifically, a basic configuration of the video camera 100B is substantially similar to that of the video camera 100A, but how data is flow, i.e., the order of processing is different between the video camera 100B and the video camera 100A. Therefore, like or similar elements are designated by the same reference numeral, the description thereof will be omitted, and only different elements will be described in detail.

Processing before the attribute information extracting section 305 detects attribute information is similar to that of the first embodiment. The attribute information extracted by the attribute information extracting section 305 is input to the multiplexing section 308. The multiplexing section 308 multiplexes coded video picture data from the video picture signal compressing section 204, coded sound data from the sound signal compressing section 210, and the attribute information from the attribute information extracting section 305 to output the multiplexed data. The multiplexed data is stored in the memory section 330.

When digest playback is being performed, the scene evaluation section 306 reads the multiplexed data from the memory section 330, gives an evaluation to each portion of a video picture based on the attribute information, extracts feature scenes from the video picture, and further extracts scenes which are to be played back as a digest from the extracted feature scenes.

Thereafter, the playback information generating section 307 generates playback information based on the scenes extracted by the scene evaluation section 306, and outputs the generated playback information to the digest playback section 309.

The digest playback section 309 reads relevant data from the memory section 330 based on the play back information generated by the playback information generating section 307, and outputs the data to the video picture display section 212 and the sound output section 214. Then, a digest video picture is played back by the video picture display section 212 and the sound output section 214.

Figure 16:
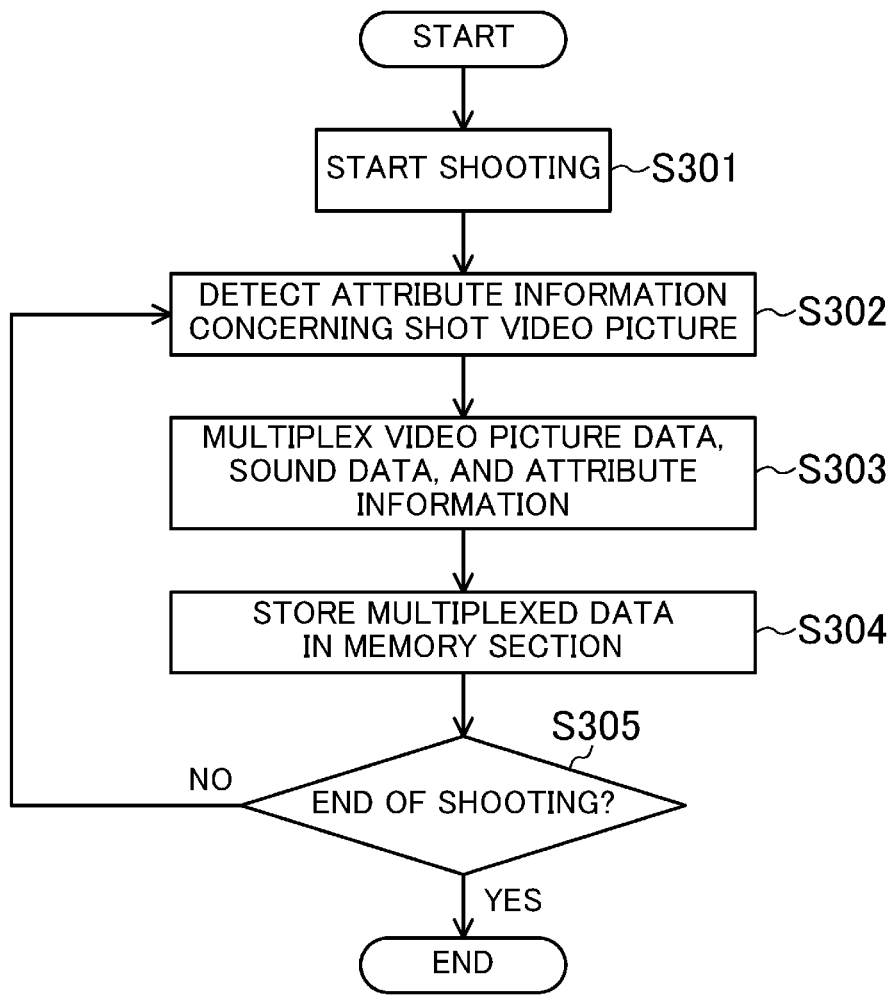
FIG. 16 is a flowchart showing a flow of processing of shooting, extraction of attribute information, and recording.
Figure 17:
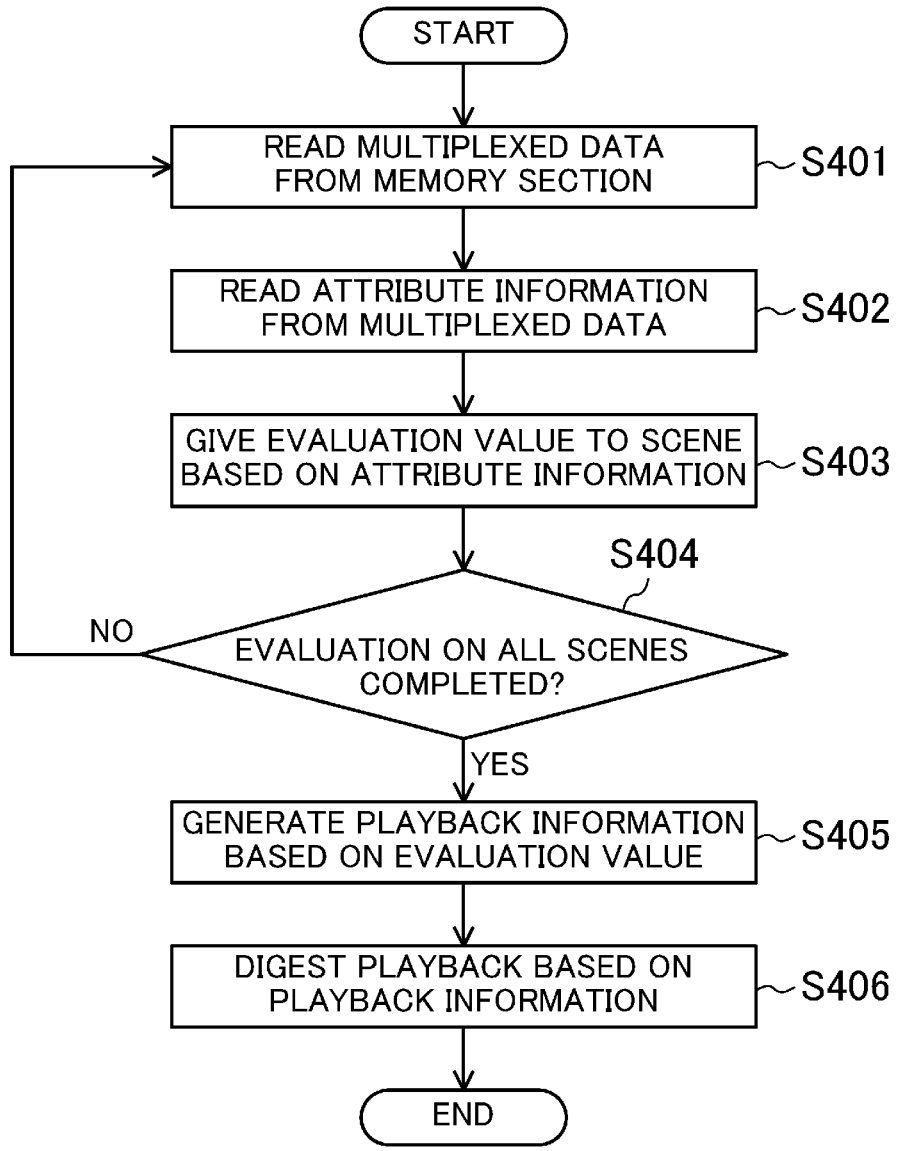
FIG. 17 is a flowchart showing a flow of processing during digest playback.

FIG. 16 is a flowchart showing a flow of processing of shooting, extraction of attribute information, and recording. FIG. 17 is a flowchart showing a flow of processing during digest playback.

First, the control section 300 of the video camera 100A starts shooting in Step S301. Shooting is started based on an input from the external input section 207 such as input button, etc.

Next, in Step S302, the attribute information extracting section 305 detects attribute information concerning a video picture based on a detection result of the attitude detecting section 206, control information of the lens control section 301, and analysis results of the video picture analysis section 303 and the sound analysis section 304, etc. In Step S303, the multiplexing section 314 multiplexes the attribute information with coded video picture data and coded sound data. In Step S304, the control section 300 stores the multiplexed data in the memory section 330.

Thereafter, in Step S106, the control section 300 determines whether an end of shooting has been input or not. If an end of shooting has not been input, the process returns to Step S302, and the shooting is continued. On the other hand, if an end of shooting has been input, the shooting is terminated.

As described above, after terminating shooting, extraction of scenes which are to be played back as a digest and generation of a playback signal are performed, when digest playback is executed.

Specifically, when an input of digest playback is input by a user via the external input section 207, the scene evaluation section 306 reads multiplexed data stored in the memory section 330 in Step S401.

Next, in Step S402, the scene evaluation section 306 decomposes the read multiplexed data and reads the attribute information. Subsequently, in Step S403, the scene evaluation section 306 gives an evaluation value to each portion of a video picture based on the attribute information. Then, in Step S404, the scene evaluation section 306 determines whether evaluation to all portions of the video picture is completed or not. If the evaluation is not completed, the process returns to Step S401, and the scene evaluation section 306 continues evaluation of the video picture. On the other hand, if the evaluation is completed, the scene evaluation section 306 proceeds to Step S405.

In Step S405, the scene evaluation section 306 extracts several feature scenes from the video picture based on the evaluation value, and furthermore, extracts scenes which are to be played back as a digest form the extracted feature scenes. Then, the playback information generating section 307 generates playback information based on the scenes which are to be played back as a digest and have been extracted by the scene evaluation section 306.

Subsequently, in Step S406, the digest playback section 309 reads, based on the playback information, the coded video picture data and the coded sound data which are to be played back from the memory section 330, outputs the read data to the video picture signal stretching section 211 and the sound signal stretching section 213, and plays back a video picture and a sound via the video picture display section 212 and the sound output section 214.

Thus, after a video picture and a sound are once stored in the memory section 330, playback information necessary for digest playback can be generated, and digest playback can be performed. According to this embodiment, after shooting, when digest playback is executed, an evaluation value for attribute information can be changed.

Other Embodiments

The above-described embodiments may have the following configurations.

Figure 18:
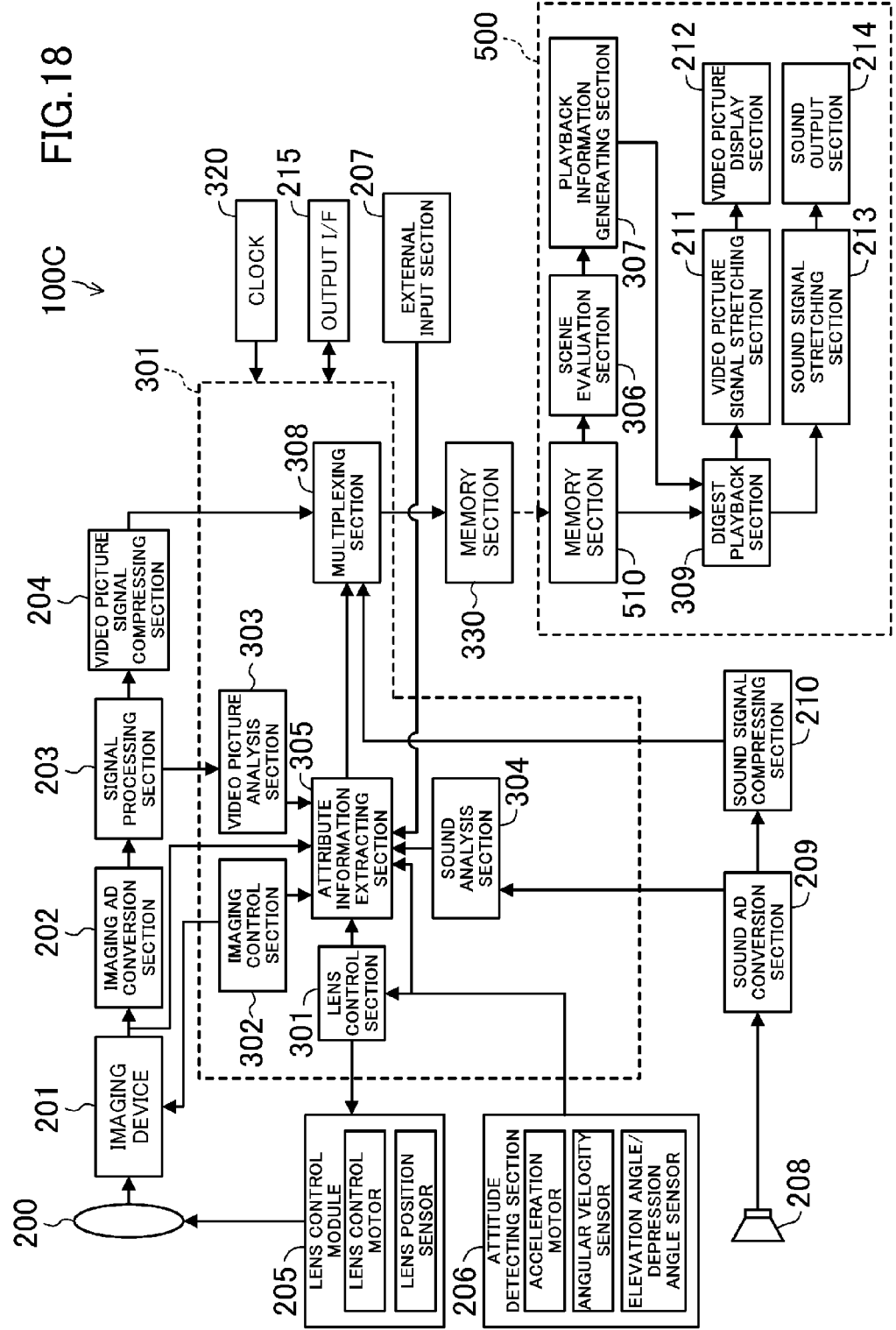
FIG. 18 is a block diagram schematically showing a configuration of a video camera according to another embodiment.

For example, the configuration of a video camera is not limited to the above-described configurations. As shown in FIG. 18, a video camera 100C may be configured to execute processing up to extraction of attribute information from a video picture which has been shot. Then, a video picture playback apparatus 500 may be configured to execute, based on video picture data to which the attribute information has been given, scene evaluation and digest playback. Furthermore, a video camera may be configured to execute processing up to scene evaluation. Then, a video picture playback apparatus may be configured to execute, based on an evaluation value, digest playback.

Furthermore, this embodiment is not limited to an imaging apparatus such as a video camera, but may be applied to a video picture editing apparatus such as a PC, etc. and a video picture recording/playback apparatus such as a HDD recorder. A video picture editing apparatus or a video picture recording/playback apparatus, etc. may be configured to extract attribute information from a video picture, evaluate, based on the attribute information, portions of the video picture, and perform digest playback based on the evaluation.

In the above-described embodiments, first, attribute information is extracted from a video picture to evaluate each portion, next, a scene is extracted based on the attribute information, and then, a digest video picture is generated based on the extracted scene. However, the present invention is not limited thereto. For example, after dividing a video picture into a plurality of scenes, extracting attribute information of each scene, and evaluating each scene based on the attribute information, a digest video picture may be generated based on the evaluation. In this case, scene dividing may be executed based on a motion vector between frames, as described above, based on an input by the user, or based on whether or not there is any attribute information (a separator between scenes, such as camera work, the ground being shot, etc.) which influences scene dividing among various attribute information.

The configuration of the video camera 100A is not limited to the above-described embodiments. For example, all or several ones of the video picture AD converting section 202, the signal processing section 203, the video picture signal compressing section 204, the sound signal AD converting section 209, the sound signal compressing section 210, the video picture signal stretching section 211, and the sound signal stretching section 213 may be realized as a single integrated circuit. Alternatively, a part of processing to be executed by the control section 300 may be separately realized as a hardware using a field programmable gate array (FPGA).

Needless to say, the process described above can be realized by a method or a software program.

In the above-described embodiments, detection of a face of a person is set as superior attribute information and fixed attribute information, and detection of a face of a particular person is set as subordinate attribute information and changeable attribute information. However, the present invention is not limited thereto. For example, detection of a face of an animal such as a dog may be set as a superior attribute information and fixed attribute information, and detection of a face of a particular dog may be input as subordinate attribute information and changeable attribute information by the user. A transportation means such as a train, a vehicle, and an airplane, etc. may be set as superior attribute information and fixed attribute information, and a particular train, vehicle, or airplane may be input as subordinate attribute information and changeable attribute information by the user. Detection of a voice of a person may be set as superior attribute information and fixed attribute information, and detection of a voice of a particular person may be input as subordinate attribute information and changeable attribute information by the user. In this case, a voice of a particular person can be input to a video camera via the microphone 208.

Furthermore, evaluation values in the table may be separately input (changed) by the user. For example, an evaluation value concerning camera work can be increased or reduced.

Note that the foregoing embodiments have been set forth merely for purposes of preferred examples in nature, and are not intended to limit the scope, applications, and use of the invention.

INDUSTRIAL APPLICABILITY

The disclosure of the present invention is useful for a video picture extracting apparatus which extracts a portion to be played back as a digest from a video picture, and an imaging apparatus including the video picture extracting apparatus.

DESCRIPTION OF REFERENCE CHARACTERS

100A, 100B, 100C Video Camera (Video Picture Extracting Apparatus, Imaging Apparatus)
300 Control Section
305 Attribute Information Extracting Section
306 Scene Evaluation Section
307 Playback Information Generating Section
309 Digest Playback Section

The invention claimed is:

1. A video picture extracting apparatus, comprising:
a memory section configured to store correspondence data between an attribute information item concerning a video picture which is to be extracted from the video picture and an evaluation for the attribute information item; and
a control section configured to extract attribution information corresponding to the attribute information item stored in the memory section from a video picture to extract a portion of the video picture to be played back as a digest, and evaluate a portion of the video picture having the attribute information based on the correspondence data,
wherein at least a portion of each of the attribute information item and the evaluation stored in the memory section is capable of being input by a user.

2. The video picture extracting apparatus of claim 1,
wherein faces of a plurality of particular people are stored in the memory section, and
information that at least one of the faces of the plurality of people stored in the memory section have been detected can be set as the attribute information item by an input by the user.

3. The video picture extracting apparatus of claim 1, wherein the attribute information item includes a superior attribute information item and a subordinate attribute information item showing more detailed attribute than that of the superior attribute.

4. The video picture extracting apparatus of claim 3, wherein the subordinate attribute information item can be input by the user.

5. The video picture extracting apparatus of claim 3, wherein
the attribute information item includes, as the superior attribute information item, information that a face of a person has been detected, and includes, as the subordinate attribute information item which is more specific than the information that the face of the person has been detected, information that a face of a particular person has been detected.

6. The video picture extracting apparatus of claim 1, wherein the attribute information item includes a fixed attribute information item which the user cannot input, and a changeable attribute information item which the user can input.

7. An imaging apparatus, comprising:
an imaging system configured to obtain a video picture; and
the video picture extracting apparatus of claim 1.

8. A video picture extracting apparatus, comprising:
a memory section configured to store correspondence data between an attribute information item concerning a video picture which is to be extracted from the video picture and an evaluation for the attribute information item;
an input section configured to input at least one of the attribute information item or the evaluation to the memory section according to an input operation of a user; and
a control section configured to extract a portion of the video picture to be played back as a digest from the video picture based on the attribute information item and the evaluation stored in the memory section.

9. A recording medium readable by a computer, storing a computer program configured to make the computer execute:
receiving, for correspondence data between an attribute information item concerning a video picture which is to be extracted from the video picture and an evaluation for the attribute information item, an input of the evaluation by a user;
extracting attribute information concerning the attribute information item included in the correspondence data from the video picture; and
extracting a portion of the video picture which is to be played back as a digest from the video picture, based on the correspondence data and the extracted attribute information.

10. A video picture extracting apparatus, comprising:
a face detection section configured to detect a face of a person from a video picture without specifying the person;
a memory section configured to store a face of a particular person registered in advance;
a particular face detection section configured to detect the face of the particular person stored in the memory section from the video picture; and
a control section configured to extract, for digest playback, a particular portion from the video picture,
wherein when the face detection section detects the face of the person and a first condition is satisfied, the control section extracts, as the particular portion, a portion of the video picture including the face of the person,
when the particular face detection section detects the face of the particular person and a second condition is satisfied, the control section extracts, as the particular portion, a portion of the video picture including the face of the particular person, and
the second condition is less restrictive than the first condition.

11. A video picture extracting apparatus, comprising:
a memory section configured to store an attribute information item concerning a video picture which is to be extracted from the video picture;
an input section configured to input the attribute information item to the memory section according to an input operation of a user;
a face detection section configured to detect a face of a person from the video picture without specifying the person;

a particular face detection section configured to detect a face of a particular person from the video picture; and a control section configured to extract, for digest playback, a particular portion from the video picture based on the attribute information item stored in the memory section, the face of the particular person registered in advance is stored in the memory section, the particular face detection section detects the face of the particular person stored in the memory section, the attribute information item includes information that the face of the person has been detected by the face detection section and a first condition is satisfied, and information that the face of the particular person has been detected by the particular face detection section and a second condition is satisfied, and the second condition is less restrictive than the first condition.

12. A recording medium readable by a computer, storing a computer program configured to make the computer execute:

detecting a face of a person from a video picture without specifying the person;

detecting a face of a particular person registered in advance from the video picture; and extracting, for digest playback, a particular portion from the video picture, wherein in the extracting the particular portion, when the face of the person is detected from the video picture without specifying the person and a first condition is satisfied, a portion of the video picture including the face of the person is extracted as the particular portion, and when the face of the particular person is detected from the video picture and a second condition is satisfied, a portion of the video picture including the face of the particular person is extracted as the particular portion, and the second condition is less restrictive than the first condition.

13. A video picture extracting apparatus, comprising:

a memory section configured to store correspondence data between an attribute information item concerning a video picture which is to be extracted from the video picture and an evaluation for the attribute information item; and a control section configured to extract attribution information corresponding to the attribute information item stored in the memory section from a video picture to extract a portion of the video picture to be played back as a digest, and evaluate a portion of the video picture having the attribute information based on the correspondence data, wherein at least a portion of each of the attribute information item and the evaluation stored in the memory section is capable of being input by a user, and the attribute information item includes information that predetermined camera work has been performed.

14. The video picture extracting apparatus of claim 13, wherein the camera work includes at least one of panning, tilting, zoom-up, or zoom-down.

15. A video picture extracting apparatus, comprising:

a memory section configured to store correspondence data between an attribute information item concerning a video picture which is to be extracted from the video picture and an evaluation for the attribute information item; and a control section configured to extract attribution information corresponding to the attribute information item stored in the memory section from a video picture to extract a portion of the video picture to be played back as a digest, and evaluate a portion of the video picture having the attribute information based on the correspondence data, wherein at least a portion of each of the attribute information item and the evaluation stored in the memory section is capable of being input by a user, and the attribute information item includes an attribute information item to which a positive evaluation is assigned, and an attribute information item to which a negative evaluation is assigned.

16. The video picture extracting apparatus of claim 15, wherein the attribute information item to which the positive evaluation is assigned includes at least one of clip-in, clip-out, still shooting after camera work, zoom-up, zoom-down, panning, tilting, detection of a particular sound, detection of a particular color, or face detection.

17. The video picture extracting apparatus of claim 15, wherein the attribute information item to which the negative evaluation is assigned includes at least one of image blur or shooting of a ground.

* * * * *